(12) United States Patent
Iljazovic et al.

(10) Patent No.: US 12,189,214 B2
(45) Date of Patent: Jan. 7, 2025

(54) EYEGLASS JOINT, JOINT SET, EYEGLASS FRAME, EYEGLASS FRAME SET, AND SPRING ELEMENT USE

(71) Applicant: Rolf-Roland Wolf GmbH, Weißenbach (AT)

(72) Inventors: Martin Iljazovic, Breitenwang (AT); Roland Wolf, Lechaschau (AT); Johannes Wacker, Bichlbach (AT)

(73) Assignee: Rolf-Roland Wolf GmbH, Weißenbach (AT)

( * ) Notice: Subject to any disclaimer, the term of this patent is extended or adjusted under 35 U.S.C. 154(b) by 569 days.

(21) Appl. No.: 16/646,332

(22) PCT Filed: Sep. 12, 2018

(86) PCT No.: PCT/EP2018/074674
§ 371 (c)(1),
(2) Date: Mar. 11, 2020

(87) PCT Pub. No.: WO2019/053093
PCT Pub. Date: Mar. 21, 2019

(65) Prior Publication Data
US 2020/0271954 A1    Aug. 27, 2020

(30) Foreign Application Priority Data

Sep. 12, 2017    (EP) ..................... 17190586

(51) Int. Cl.
*G02C 5/22*    (2006.01)
(52) U.S. Cl.
CPC ......... *G02C 5/2254* (2013.01); *G02C 5/2272* (2013.01); *G02C 2200/16* (2013.01)
(58) Field of Classification Search
CPC ................ G02C 5/2254; G02C 5/2272; G02C 5/2209; G02C 2200/16
See application file for complete search history.

(56) References Cited

U.S. PATENT DOCUMENTS

| 5,009,495 A | * | 4/1991 | Williams | ............... G02C 5/008 |
| | | | | 351/153 |
| 5,410,374 A | * | 4/1995 | Smith | .................... G02C 5/008 |
| | | | | 351/150 |
| 5,583,588 A | * | 12/1996 | Chao | .................... G02C 5/2254 |
| | | | | 351/153 |

(Continued)

FOREIGN PATENT DOCUMENTS

| AT | 12049 U1 | * | 7/2011 | ............. G02C 5/008 |
| DE | 19710924 A1 | * | 11/1997 | ............... G02C 5/00 |

(Continued)

OTHER PUBLICATIONS

First Office Action, including Search Report, for Chinese Patent Application No. 201880073196.3, dated Jun. 11, 2021, 12 pages.

(Continued)

*Primary Examiner* — Emily M Morgan
(74) *Attorney, Agent, or Firm* — Westman, Champlin & Koehler, P.A.

(57) ABSTRACT

The invention relates to an eyeglass joint for an eyeglass frame with a first joint part assigned to a rim of the eyeglass frame, and a second joint part assigned to an eyeglass temple of the eyeglass frame, wherein the joint parts are movably connected to each other by means of at least one spring element attached to both joint parts, wherein the spring element preferably has a closed annular shape and/or is rubber-elastic. Furthermore, the invention relates to a joint set, an eyeglass frame, an eyeglass frame set, and the use of a spring element.

9 Claims, 23 Drawing Sheets

(56) References Cited

U.S. PATENT DOCUMENTS

| | | | | |
|---|---|---|---|---|
| 5,631,719 | A | * | 5/1997 | Chao ................ G02C 5/008 351/113 |
| 6,168,341 | B1 | * | 1/2001 | Chene ............. E05D 11/1064 403/123 |
| 8,820,922 | B2 | | 9/2014 | Haffmans et al. |
| 2012/0287396 | A1 | | 11/2012 | Fuchs et al. |
| 2012/0307197 | A1 | * | 12/2012 | Haffmans ........... G02C 5/2254 16/224 |
| 2016/0033790 | A1 | * | 2/2016 | Young ............... G02C 5/2209 351/114 |
| 2017/0227787 | A1 | * | 8/2017 | Chen ................ G02C 5/2209 |
| 2021/0033884 | A1 | * | 2/2021 | Guerin .............. G02C 5/2254 |

FOREIGN PATENT DOCUMENTS

| | | |
|---|---|---|
| DE | 29815893 U1 | 1/1999 |
| DE | 202013006158 U1 | 10/2013 |
| EP | 2478408 B1 | 12/2016 |
| FR | 2690760 A1 | 11/1993 |
| FR | 3033414 A1 | 9/2016 |
| WO | 2009057171 A1 | 5/2009 |
| WO | WO-2018188906 A1 * 10/2018 ............. A61F 9/027 |

OTHER PUBLICATIONS

International Preliminary Report on Patentability for International Application No. PCT/EP2018/074674, dated Mar. 17, 2020, 16 pages.

International Search Report and Written Opinion for International Application No. PCT/EP2018/074674, dated Mar. 21, 2019, 20 pages.

European Search Report for foreign priority No. EP17190586.2, dated Mar. 13, 2018, 4 pages.

Notice of Reasons for Refusal, for Japanese Patent Application No. 2020-535309, dated Jan. 11, 2023, 4 pages.

* cited by examiner

EYEGLASS JOINT, JOINT SET, EYEGLASS FRAME, EYEGLASS FRAME SET, AND SPRING ELEMENT USE

CROSS-REFERENCE TO RELATED APPLICATIONS

This application is a Section 371 National Stage Application of International Application No. PCT/EP2018/074674, filed on Sep. 12, 2018, which published as WO 2019053093 A1, on Mar. 21, 2019, and claims priority to European Patent Application No. 17190586.2, filed on Sep. 12, 2017, the contents of which are incorporated herein by reference in their entireties.

FIELD

The present invention relates to an eyeglass joint for an eyeglass frame. Furthermore, the invention relates to a joint set for the configurable formation of an eyeglass joint. Moreover, the invention relates to the use of a spring element.

BACKGROUND

Conventional glasses have a rim for holding the respective lenses and temples to hold the eyeglasses on the user's head. A simple hinge joint is usually provided between such a rim and each temple. This hinge joint is usually connected by means of an axle pin, in particular in the form of a small screw. This screw determines the axis of movement of the hinge joint. The joint allows the temple to fold open around this axis of movement so that the glasses can be put on the head of the wearer. In order to save space and for safe stowing, the temples can be folded closed again to fold them together on or close to the frame. As a result, the glasses are much flatter and can be stored, e.g., in a suitable case in a space-saving manner. This also reduces the risk of the temples breaking or the joint being damaged. However, the disadvantage is that this hinge joint can easily be damaged if it is overstretched when the temples are folded open, over-compressed when the temples are folded closed, and/or if it is subjected to a force which acts transversely to a movement plane defined by the axis of movement. Furthermore, such an eyeglass joint cannot be adapted to the individual needs of different wearers and requires a precise and elaborate manufacture in order to be as gap-free and free of play as possible to ensure a safe fit of the glasses.

EP-B1 2 478 408 discloses an eyeglass hinge wherein two hinge parts are held together with at least one metallic clamp connection. This hinge can supposedly automatically move from certain hinge positions into a use position and into a stowage position. Moreover, it allows for overstretching of the hinge without it being directly damaged. However, the disadvantage of this hinge is that it is difficult to assemble and maintain. In particular in the case of an overstretching and/or movement of the hinge that leads to a permanent deformation of the clamp connection, it can no longer easily be restored. The owner of the glasses may then have to bring them to an optician for maintenance. Finally, the functionality of the hinge could also be improved.

An eyeglass joint is also known from the designer Philippe Stark, which allegedly allows eyeglass temples to move relative to a frame even outside a movement plane defined by a single axis. For example, this eyeglass joint allows the respective temples to be moved downwards or upwards relative to the frame of the glasses as well without causing direct damage to the eyeglass joint. For this purpose, this eyeglass joint comprises two joint parts which are provided at a ball held between them. Furthermore, one of the joint parts is clamped against the ball via a sleeve with a metallic compression spring, in order to effect an automatic return to an initial position. Thus, this eyeglass joint requires a variety of parts and is complex and expensive to produce and to assemble. In addition, this eyeglass joint cannot easily be serviced by the user himself. In particular, the spring element of the joint is completely recessed in the temple of the eyeglasses and therefore not readily accessible. Finally, the functionality of the joint could be improved as well.

SUMMARY

It is the object of the present invention to provide an improved or at least an alternative eyeglass joint for an eyeglass frame. In particular, an eyeglass joint is to be provided which is especially robust and easy to handle. Furthermore, in a preferred object of the present invention, a joint set for the configurable forming of an eyeglass joint is provided wherein an eyeglass joint can easily be adapted to different needs of an eyeglass wearer. It is also a preferred object of the present invention to provide an eyeglass joint which is especially robust and easy to handle. Another preferred object of the present invention is to provide an eyeglass frame set by means of which an eyeglass frame can be adapted especially well to different needs of the respective wearer. It is also a preferred object of the present invention to create a novel use of a spring element.

These objects are achieved according to the present invention by the subject matter of the independent claims. Advantageous embodiments with suitable realizations of the invention are described in the dependent claims, wherein preferred embodiments of any subject matter of the invention are to be considered preferred embodiments of all the other subject matters of the invention and vice versa.

A first aspect of the invention relates to an eyeglass joint for an eyeglass frame with a first joint part assigned to a rim of the eyeglass frame, and a second joint part assigned to an eyeglass temple of the eyeglass frame, wherein the joint parts are movably connected to each other by means of at least one spring element attached to both joint parts. The spring element preferably has a closed annular shape and/or is rubber-elastic. The eyeglass joint only requires three different components which makes it particularly easy to design. Accordingly, the eyeglass joint is easy to manufacture, assemble, and/or maintain. The spring element can furthermore be especially robust in the face of overload. Finally, such a joint can have an advantageous modular construction which is specifically adapted to the needs of a user.

Since the two joint parts are connected via a spring element and not via a rigid axis, the eyeglass joint cannot be directly damaged by a movement outside of a movement plane which is otherwise determined by a rigid axis. No rigid axis is needed for the eyeglass joint. This makes the eyeglass joint particularly easy to handle. In particular, it may be possible for the wearer to maintain the eyeglass joint without having to consult an optician. In contrast to a hinge joint, in which the two joint parts are connected by means of a screw, the eyeglass joint also does not tend to loosen due to repeated movements of the joint parts relative to each other. In addition, overstretching and/or over-compressing does not result in a permanent deformation of the joint, in particular when a rubber-elastic spring element is used, which then requires maintenance and/or realignment of the glasses on a wearer.

A spring element with a closed annular shape is particularly simple and cost-effective to manufacture. In addition, it can easily be attached to the respective joint parts. A rubber-elastic spring element as well is particularly cost-effective and especially robust for extensive stretching, in particular due to joint positions outside of a common movement range predetermined by the opening and folding of eyeglass temples. In contrast to, for example, a metallic spring element, a rubber-elastic spring element will less easily deform permanently and can be replaced more cost-effectively after such a deformation. In addition, a spring element made of a rubber-elastic material can be lighter than one made of a metallic material, in particular at the same or lower manufacturing effort and/or equal or higher robustness.

The spring element can for example be formed from a rubber material. Natural rubber, butadiene-acrylonitrile rubber, styrene-butadiene rubber, hydrogenated nitrile rubber, ethylenepropylene rubber, thermoplastic polyurethane elastomers and/or chloroprene rubber can for example be used as a material for the spring element. In particular, the spring element can consist of one of these materials or a mixture thereof.

The rim can be designed to hold the respective lenses of the glasses. The eyeglass temples of the eyeglass frame can be provided as ear hooks and/or headbands. For example, an eyeglass temple may be designed to grab an ear of a wearer at least partially and thus hold the glasses on the head of the wearer. Alternatively, or additionally, the eyeglass temple can also lie on the side of the head of the wearer with a certain tension and thus also prevent the glasses from slipping forward and/or sliding off the wearer's nose. This tension can be generated by the eyeglass joint when the wearer puts the glasses on, in particular by the spring element. In that case, there is no need for a elastic deformability of the eyeglass temples, or at the very least, the deformability can be decreased. For the eyeglass joint, this in particular means that during the wearing of the glasses, the spring element is stretched to a certain degree so that the eyeglass temples are pressed to the head of the wearer, including, for instance, a slight overstretching beyond the open position.

Preferably, the spring element is attached to the two joint parts in such a way that a certain preload is generated, which causes the first and the second joint part to be held against each other by means of the spring element. In particular, at any time, the two joint parts can be held by the spring element such that they are pressed against each other with a certain preload force and/or at least one partial portion of one joint part is in contact with one partial portion of another of the joint parts. Preferably, the spring element exhibits a progressive and substantially constant spring characteristic curve. The spring element may be formed as a compression or tension spring, preferably, the spring element is formed as a tension spring. By providing a tension spring, the eyeglass joint can be particularly compact and robust. Preferably, no connection is provided between the two joint parts with the exception of the respective spring elements. This makes the construction of the eyeglass joint particularly simple and robust.

The spring element can, for example, be detachably connected to the respective joint parts. This way, the eyeglass joint can be disassembled allows the eyeglass joint to be dismantled. In addition, the spring element can also easily be replaced if it is damaged. In the same way, the respective joint parts can easily be replaced if they are damaged. This makes the eyeglass joint particularly easy to maintain. In addition, a built-in spring element can also easily be replaced with another spring element, for example one with a different preload, in order to be able to adapt the eyeglass joint to different requirements. In the same way, however, respective joint parts can also be exchanged for joint parts with different geometries, with or without the respective eyeglass frame parts, such as rims or temples, in order to be able to adapt an eyeglass joint and/or an eyeglass frame to different requirements.

The spring element can for example also be formed as a simple band and/or cord. For example, a cross-section of the spring element can be angular, in particular rectangular, and/or round. An angular, especially rectangular, cross-section can be held particularly easily on the joint parts while a round cross-section can glide well on the joint parts and/or be particularly cost-effective and robust. The material of the spring element can be UV-resistant. For this purpose, a rubber material can for example be treated to become UV-resistant.

The respective joint parts can be substantially rigid. For example, wood, stone, horn, plastic and/or metal are suitable materials for the joint parts.

In contrast to a common hinge, the eyeglass joint has more than one degree of freedom. Thus, unwanted movements, which do not lead to an adjustment of the joint between a use position, in which the glasses can be placed on the head of a wearer, and a stowage position, in which the eyeglass temples are substantially touching the rim of the glasses and/or are folded and the glasses can be easily stowed in a case, are less likely to result in damage to the eyeglass joint.

Hereinafter, the eyeglass joint can also simply be referred to as joint. A closed annular shaped rubber-elastic spring element can also be referred to as rubber band or rubber ring. The eyeglass joint can only comprise two joint parts and no additional joint parts and/or additional connecting elements with the exception of respective spring elements.

In a further advantageous embodiment of the eyeglass joint, it is provided that at least one of the joint parts, preferably both joint parts, comprise a retaining element each to which the spring element is attached. The retaining element is cone-shaped and/or hook-shaped. Preferably, the spring element is at least portion-wise looped around the retaining element. This is a particularly simple and robust connection of the spring element with the respective joint parts in terms of construction. In particular, this way, the spring element can easily be detached from the respective joint parts, for example by simply pulling it off the retaining elements. The spring element can then in particular be held by a certain preload. A preload can be generated by an elongation of the spring element beyond an unstretched, in particular loose, length. A cone-like shape is particularly cost-effective to manufacture, and assembly and disassembly of the respective spring elements is particularly easy. A hook-like shape prevents an unintentional loosening of the spring element particularly well, especially over a particularly large joint position range. The hook can be formed in such a way that the spring element nevertheless automatically jumps off the hook at certain joint positions. This prevents damage to the eyeglass joint in the event of improper joint positions.

The first joint part can, for example, comprise a first retaining element and the second joint part a second retaining element. The respective retaining elements can be arranged symmetrically to an axis of rotation, or a pivot point of the joint, respective contact surfaces between the joint parts, and/or respective ends of the joint parts facing each other. In particular, the respective retaining elements can be arranged symmetrically to the respective contact surfaces of the two joint parts. The respective retaining elements can be formed identically on both joint parts. The respective retaining elements can be one piece and/or formed integrally with the respective joint parts. With such a design, any additional elements, such as for example a pin for blocking an annular spring element at a through opening, through which it is guided, are no longer necessary. Accordingly, no element for fixing the spring element can be lost and the construction of the eyeglass joint is therefore particularly simple and robust as a whole.

A retaining element on a joint part can be arranged further away from an axis of rotation or a pivot point of the joint, respective contact surfaces between the joint parts and/or respective ends of the joint parts facing each other than another retaining element on the other joint part. For example, the retaining element on the second joint part may be further spaced from a pivot point of the joint or a rotational portion of the joint parts relative to each other than a corresponding retaining element on the first joint part. As a result, an existing assembly space can be used particularly well to provide a particularly long spring element. A long spring element allows greater stretching than a shorter spring element without damaging the spring element and thus the eyeglass joint. Usually there is more space at the eyeglass temple to provide a longer part of the spring element there than on a joint part, which is assigned to the rim of the glasses. There, a longer spring element part could possibly limit the space for providing respective lenses. In addition, longer joint parts on the side of the rim can cause the rim height to be higher in a closed state. This means that with folded eyeglass temples, the distance between the temples and the rim can be greater.

In a further advantageous embodiment of the eyeglass joint, it is provided that at least one of the joint parts comprises several retaining elements spaced apart for attaching the spring element at different positions on this joint part. Thus, by changing the respective retaining element holding the spring element, the preload of the spring element can be easily adjusted. Thus, depending on the desire of the wearer, a greater or smaller force can be provided for opening and closing, or unfolding and folding, the eyeglass temples, i.e. an adjustment between the stowage position and the use position. In addition, a different force can be specified with which the respective eyeglass temples press against the head of the wearer. In addition, spring elements of different lengths can be used for the same eyeglass joint, in particular without changing the previously described actuating forces.

In a further advantageous embodiment of the eyeglass joint, it is provided that the two joint parts are tensioned against each other by the spring element in order to movably connect them. Thus, a certain contact area can be predetermined, around which the two joint parts move relative to each other, and a joint gap can be minimized, preferably in every joint position. Thus, at least in a certain range of motion, an axis of rotation of the eyeglass joint can be predetermined, at least in a certain movement range. Alternatively, a pivot point of the eyeglass joint can be predetermined. In addition, the two joint parts are substantially connected to each other in a defined relative position. For example, a defined position and/or contact surface of the two joint parts can thus be predetermined in the use position and in the stowage position. As a result, the eyeglass joint is of a particularly high-quality appearance; in particular, it does not give the impression that the two joint parts wobble and/or are only loosely connected to each other. By minimizing the joint gap due to the preload, the respective manufacturing tolerances can also be particularly large, which makes manufacturing particularly cost-effective and easy.

In a further advantageous embodiment of the eyeglass joint, it is provided that one of the joint parts has a receiving portion, on which a corresponding rolling portion of the other of the joint parts rolls and/or slides during a joint movement. In contrast to, for example, a hinge with an axle pin and/or a joint with a ball arranged between two joint parts, no additional component for predetermining the movement of the joint parts relative to each other is required. In particular, a strictly predetermined axis of the movement of the joint is not required wherein movements deviating from this axis can quickly damage the joint. Instead, the movement of the joint is predetermined by the rolling and/or sliding of the joint parts at each other and the contact force generated by the spring element and its optionally resulting stretching. The geometry of the joint parts, in particular the rolling and receiving portions, in particular allows a targeted movement of the joint parts to each other as well as a defined positioning in retaining or resting positions, such as the use position and/or the stowage position.

The receiving portion may be formed, for example, as a socket and the rolling portion as a joint ball. The rolling portion can also be called a sliding portion and/or a slipping portion. The two portions can therefore be respective contact surfaces between the two joint parts, which are in contact with each other at least in certain joint positions and/or at portion-wise.

The rolling portion can for example be formed as a square or cuboid with rounded corners. One of these rounded corners can be facing the other joint in the use position and/or the stowage position. Accordingly, the receiving portion may be formed as a corresponding, square or cuboid-shaped recess in the other joint part. The rounded corner of the rolling portion then slides and/or rolls on the respective surfaces of the receiving portion and the joint jumps into corresponding positions as soon as the respective flat portions of the two square shapes come close to each other, and/or as soon as the corner of a recess of a receiving portion has passed a corresponding corner of the rolling portion. Thus, respective eyeglass temples can jump or engage into the respective final position of the stowage position and the use position, in particular from predetermined joint position ranges. These joint position ranges can be assigned to one of these positions at a time and can optionally be directly adjacent to each other.

An alternative embodiment is for example a cylindrical rolling portion and a corresponding cylindrical recess as the receiving portion. This shape of the rolling portion and the receiving portion is particularly suitable for predetermining the joint movement at an (imagined) axis of rotation whereby for example a twisting and/or an upward or downward bending of the eyeglass temple during its adjustment can be avoided particularly well, at the same time allowing such a deviating movement without damage to the joint. An upward direction can for example be defined by a wearing position of a pair of glasses with the eyeglass joint. In addition, the two joint parts slide particularly easily and evenly together in such an embodiment. This makes the eyeglass joint particularly easy to handle when adjusting between different positions.

The receiving portion and/or rolling portion can also be provided as polygonal shapes, for example a hexagonal basic shape in a plan view of the joint part. This can reduce a corresponding engaging effect in the respective end positions.

In a further advantageous embodiment of the eyeglass joint, it is provided that the receiving portion and/or the rolling portion each comprise at least two support surfaces, in particular substantially flat support surfaces, which are at an angle of between 75° and 105° to one another, preferably between 87° and 93°. In particular, the two flat support surfaces can be perpendicular to each other. If there are more than two support surfaces, pairs of two can be at such an angle. Metastable joint positions can be defined by means of the support surfaces. These joint positions are metastable, for example, due to the flat support of the surface pairs and the preload due to the spring element. This means that the eyeglass joint can only leave this joint position when an external, predetermined minimum force is applied, otherwise it remains in this position.

Preferably at least one, and preferably both, of the contact surfaces are inclined towards at least one main extension axis of one of the two joint parts—preferably in a plan view substantially perpendicular to the movement plane (cf. FIG. 3)—in particular in a use position and/or a stowage position. It is furthermore preferred that the other contact surface(s) is (are) also inclined towards the main extension axis of at least another of the two joint parts, in particular in the stowage position and/or the use position. In particular, in addition or alternatively, each of the contact surfaces may be inclined towards the main extension axis of both joint parts both in the use position and in the stowage position. The inclination of the contact surface with respect to the main extension axis is preferably only dependent on the joint position of the joint part at which the respective contact surface is not formed. At the joint part at which the contact surface is formed, its inclination to the corresponding main extension axis is preferably independent of the joint position. Preferably, at least one of the main extension axes is substantially parallel to a longitudinal axis of an eyeglass temple which is connected to the second joint part. In particular, the contact surfaces (in this case, based on the respective smaller angle to the corresponding axis) may be inclined by 30 to 70° to these axes in the movement plane, preferably 40° to 50°. Furthermore, it is preferred that the angle not be 90°.

In particular, in addition or alternatively to the above-mentioned features, two contact surfaces formed on a single joint part preferably form a V-shape, in particular at its rolling portion or receiving portion. This V-shape preferably extends into the movement plane and its angle bisector extends substantially parallel to a main extension axis of a joint part at which the contact surfaces are formed, preferably inclined at an angle of about +/−20°, more preferred up to +/−10° and also preferred +/5° (in particular in the movement plane). Preferably, the angle bisector is substantially parallel in the use position or in the stowage position, preferably inclined at an angle of about +/−20°, more preferred +/−10° and also preferably +/5° (in particular in the movement plane) to the main extension plane, at which the plant surface is not formed. This design results in a particularly good self-adjustment of the eyeglass joint. Two V-shaped contact surfaces may be formed on both joint parts, wherein these preferably correspond to each other.

The main extension axis of the respective joint parts can be defined by their longitudinal extension. In particular, the main extension axis of the second joint part can substantially correspond to a longitudinal extension of the eyeglass temple, and the main extension axis of the first joint part can substantially correspond to the longitudinal extension of the eyeglass temple at least in a position in which the eyeglass joint is open so far that the two joint parts are substantially on an axis with their main extension directions. This may, for example, be the use position. The use and stowage positions will be explained in more detail below.

In addition, the eyeglass joint is automatically adjusted by means of the spring element in the metastable joint positions, in particular starting from a certain approximation to this joint position. This can, for example, cause an engaging into the respective end positions of the eyeglass joint. Thus, the eyeglass joint can, for example, automatically jump into the use position and/or the stowage position, if a wearer adjusts the eyeglass joint in the direction of this position. The respective support surfaces can be directly adjacent to each other or they can also be connected by means of a curved section and/or a rounded corner. A curved section and/or a rounded corner in particular allows a particularly easy sliding and/or rolling of the two joint parts against each other, thus facilitating an especially easy adjustment between the two metastable joint positions.

In a further advantageous embodiment of the eyeglass joint, it is provided that the eyeglass joint is designed such that one of the joint parts can move relative to the other of the joint parts substantially in a movement plane such that the eyeglass joint can be adjusted between a stowage position and a use position of the eyeglass frame. The stowage position can substantially correspond to folded eyeglass temples, thus allowing storage of the eyeglasses in a case in a space-saving manner. In this position, the two main extension axes of the two joint parts can be at an angle of about 90° to each other. The use position can substantially correspond to unfolded eyeglass temples. In the use position, a pair of glasses can be placed on the head of a wearer, or be worn, and in particular, the frame can rest on the nose of an eyeglass wearer, while respective eyeglass temples enclose the head and at least portion-wise abut the ears. Preferably, the joint has an opening angle of approx. 180°, in particular with respect to the respective main extension axes of the respective joint parts. The two preferred angles mentioned above correspond to a design in which the two main extension directions of the two joint parts in the use position are substantially on one axis. That is, in the use position, the main extension directions of both joint parts form an extension of the main extension of the eyeglass temple. Alternatively, for example, the first joint part with its main extension direction can be substantially arranged in a main extension plane of the eyeglass frame or respective lenses. In the use position, the eyeglass joint can then, for example, form an angle of approx. 90° between the two joint parts. In the stowage position, the two joint parts are then substantially parallel to each other, thus substantially forming a joint angle of 0°. The joint angle can be measured on the inside on one side which is facing the head of the wearer when using the glasses.

Preferably, the two joint parts are able to rotate relative to each other by at least 70° in the movement plane for adjusting between the stowage position and the use position, especially preferred, at least 90° or more. The movement between the use position and the stowage position can be a rotation around an axis, which is predetermined by the contact surfaces of the two joint parts with each other. Due to the geometry of the joint parts and a tension generated by the spring element, the joint performs a rotation around this axis during adjusting. However, a deviation due to transverse forces may occur; accordingly, the movement plane or axis of movement can be formed as and/or considered metastable.

The movement between the use position and the stowage position can be an overlay of a rotary and translational movement, which can be predetermined in particular by a rolling and/or a sliding of the respective joint parts to each other. The movement between the stowage position and the use position can also be formed as a pivoting movement. The kinematics of the eyeglass joint are predetermined in particular by the geometries of the respective joint parts, in particular the respective geometries of the receiving portion and the rolling portion, and/or by the spring element, in particular its spring characteristic curve, and the preload in one and/or both of the stowage and use positions.

In a further advantageous embodiment of the eyeglass joint, it is provided that the two joint parts are at least partially guided relative to each other through the receiving portion and the corresponding rolling portion in the movement plane. Based on this guide, a defined rotational movement can be predetermined in the movement plane, which allows a particularly easy adjustment of the eyeglass joint between the use position and the stowage position so that it is easy to handle.

This guidance can for example be formed by contact surfaces at the receiving portion above and/or below corresponding contact surfaces of the rolling portion in and/or parallel to this plane; thus, corresponding surfaces in particular along an axis orthogonally to the plane. For instance, a cuboid rolling portion can be supported above and below the movement plane. During the adjustment, optionally also in the stowage and/or in the use position, the rolling portion is therefore supported by these guide surfaces, so that the two joint parts are guided relative to each other in the movement plane. These surfaces, in particular their size, and/or respective fits can be formed in such a way a tilting of one of the two joint parts relative to the other joint part from the movement plane can occur nevertheless so that respective joint parts and/or the spring element are not easily damaged. This prevents the eyeglass joint from being damaged even under unforeseen loads, such as pressing on the glasses in the stowage position, or laying one's head on a pillow with glasses placed on it in the use position.

In the use position, the joint parts can substantially connect flush to each other. In particular, respective outer surfaces can be adjacent flush to each other. However, it can also be provided that only any external surfaces that are visible when the glasses are worn connect flush to each other. A contact surface between the two joint parts can for example be beveled on a side facing away from the head of the wearer, and/or the joint parts may have an overlap there, for example, they can be mitered to cover a joint gap.

In a further advantageous embodiment of the eyeglass joint, it is provided that the joint parts, in particular the receiving portion and/or the rolling portion, are designed to stabilize the eyeglass joint in the stowage position and/or the use position, in particular by means of at least one stop and/or at least one engaging surface at the receiving portion and/or rolling portion. As a result, the eyeglass joint can have a metastable state in the stowage position and/or the use position. In particular, some or all intermediate positions between these two positions may be unstable. It can also be provided that the spring element generates such a preload that the eyeglass joint automatically adjusts from the unstable states to the metastable state.

Respective stops can be provided on each joint part or only on one of the two joint parts. A stop may be provided, for example, in the form of a notch and/or an edge, for example at the rolling portion and/or the receiving portion. The respective engaging surfaces can be formed correspondingly to each other on both joint parts, so that two corresponding engaging surfaces form support surfaces for a metastable state. The engaging surfaces may be formed accordingly as support surfaces. The engaging surfaces may correspond to a stop and/or be part of a stop. The engaging surfaces, respective stops and/or a geometry of the rolling portions and receiving portion as a whole can also cause a locking of the eyeglass joint in a metastable state, i.e. particularly in the use position and/or in the stowage position. For example, one of the two joint parts may comprise a groove and another of the two joint parts a corresponding tongue, which engages into place in the corresponding groove in the use position and/or in the stowage position. In order for the groove to be moved into the corresponding recess, the eyeglass joint as a whole can deform elastically. This elastic deformation can be provided in particular by an elastic deformation of the spring element, so that the elastic deformation does not have to be provided by the respective joint parts. For example, for engaging, an evasive movement of one of the joint parts away from the other joint part can be carried out under additional stretching of the spring element. As a result, the two joint parts can be particularly rigid and robust, which in turn makes the eyeglass joint as a whole particularly robust.

In a further advantageous embodiment of the eyeglass joint it is provided that the eyeglass joint is designed to automatically adjust to the stowage position in a first joint position range, in particular in a first angular range in the movement plane, by means of the spring element, and/or the eyeglass joint is designed to automatically adjust to the use position in a second joint position range, in particular in a second angular range in the movement plane, by means of the spring element. For example, the eyeglass joint can adjust automatically to the stowage position from a joint position which is closer to the stowage position than to the use position. Accordingly, the eyeglass joint can adjust automatically to the use position from another joint position range closer to the use position.

For example, it can also be provided that at least in a certain angular range in the movement plane, a larger angular range leads to a self-adjusting to the stowage position rather than to the use position. For example, it can be provided that a user of the glasses has to open the eyeglass joint to at least 70° before it automatically engages into the use position. Conversely, it is then provided that the user only has to fold the eyeglass joint by about 20° before it automatically engages into the stowage position. Due to such uneven metastability, the glasses can be particularly comfortable to use. For instance, this ensures that the eyeglass joint adjusts particularly early into the protective stowage position. Conversely, it can of course also be provided that the eyeglass joint engages into the use position especially early, so that it is particularly easy for an eyeglass wearer to open and put on the glasses.

The joint position range can be certain relative spatial positions of the two joint parts relative to each other. The corresponding angular ranges can be determined, for example, by the respective geometries of the rolling portion and/or the receiving portion, in particular by respective support surfaces and/or corners, which may, in particular, be rounded. The respective angular ranges can define the respective metastable positions of the eyeglass joint. In addition, the respective angular ranges can also be predetermined or adjusted by the preload provided by the spring element. In particular, the spring element can be attached to the two joint parts with such a high preload that the eyeglass joint is unable to remain in any position other than the use position and the stowage position. This means that there is no other metastable area. By means of an accordingly high preload, a transition range between the two angular ranges can be so small that with normal movement of the eyeglass joint, it is not to be expected that the eyeglass joint accidentally, as it were, remains between the two positions.

In a further advantageous embodiment of the eyeglass joint, it is provided that the eyeglass joint is designed to allow a movement of the joint parts relative to each other in the movement plane beyond the stowage position and beyond the use position, wherein the eyeglass joint is designed to automatically return to the stowage position or the use position by means of the spring element. The movement of the joint parts relative to each other beyond the stowage position and/or beyond the use position can also be referred to as overstretching and/or overextending of the eyeglass joint. A movement beyond the stowage position can also be referred to as over-compressing. In the case of simple hinge joints, for example, if the respective eyeglass temple is folded open too widely, the joint or respective joint parts can break and/or be permanently deformed. In the eyeglass joint according to the present invention with the spring element, a further elongation of the spring element can be carried out instead, since the two joint parts can be connected to each other by the spring element only. As a result, there is no immediate damage to the eyeglass joint if the respective eyeglass temples are bent too far and/or pressed together too far. In particular, there no potential damage since no rigid part of the eyeglass joint is permanently deformed in the case of overstretching and/or over-compressing.

This allows, for example, for the glasses to be worn comfortably when a wearer lays his head sideways on a pillow. The glasses can also be protected from damage if they are worn hooked onto a shirt and another person hugs the wearer and the glasses are wedged between their chests.

Preferably, the eyeglass joint is designed to exceed a structural load limit of the spring element in at least one joint position, in particular at least one overstretched and/or over-compressed joint position, while the structural load limit of other parts, in particular of the two joint parts and/or respective retaining elements, is not yet reached. A respective structural load limit of the spring element may therefore be less than a load in the overstretched and/or over-compressed joint position, while a structural load limit of the remaining parts may be greater. Thus, an overloading of the eyeglass joint first causes a fracture of the spring element, hence dissolving the connection between the joint parts and preventing any further forces from being transferred via the joint. This protects other parts of the eyeglass joint from damage, in particular the two joint parts and/or respective retaining elements. For example, an overload only results in the tearing of a comparatively inexpensive rubber-elastic spring element, while the comparatively expensive joint parts remain intact. The spring element can then be replaced easily, quickly and cost-effectively, which means that the eyeglass joint can be repaired cost-effectively and easily even after damage caused by overloading.

Alternatively, or additionally, the eyeglass joint may be formed in such a way that a structural load limit of each part, in particular of the spring element, the two joint parts and/or respective retaining elements is not yet reached at a maximum overstretched and/or over-compressed joint position. A respective structural load limit of the respective parts can therefore be higher than a load in the maximum overstretched and/or maximum over-compressed joint position. This prevents damage to the joint in the respective maximum positions. For this purpose, in particular, a sufficiently stable and/or stretchable spring element can be provided. The maximum overstretched and/or maximum over-compressed joint position can be defined by a movement in the movement plane, which is then limited by contact with the respective parts. For example, the maximum over-compressed joint position can be achieved if the respective eyeglass temples are in contact with the inner side of the rim and/or the lenses and block further movement. Similarly, a maximum overstretched joint position can be achieved if the second joint part and/or respective eyeglass temple are in contact with the outer side of the rim and/or the first joint part. Such a bent open position can also correspond to an approximate opening angle of the joint of 360°.

In a further advantageous embodiment of the eyeglass joint, it is provided that respective cone-shaped and/or hook-shaped retaining elements substantially extend in the movement plane and/or that a plane defined by the ring shape of the spring element extends substantially transversely, or transversely to the movement plane, in particular orthogonally to it. This allows the spring element to be easily attached to the retaining elements within the movement plane. The plane in which the ring shape of the spring element extends transversely, can be defined at a stretched joint, i.e. in the use position, in which respective joint parts are folded open at an angle of 180° to each other. Otherwise, an annular spring element may be bent. In that case, as an alternative to the example, respective end points can for example define the plane.

Due to this orientation of the spring element and/or the retaining elements, they can be placed particularly easily on the side of the eyeglass joint facing the head of the wearer, and they would then be concealed by the two joint parts when the glasses are worn. Thus, the eyeglass joint can have a particularly smooth appearance from the outside when the glasses are worn, and it is also especially well protected against damage and/or dirt. In addition, the spring element can easily be attached to the retaining elements. Such an arrangement also allows the spring element to easily come off the respective retaining elements when the eyeglass joint is overstretched or over-compressed beyond the use position and the stowage position, respectively. This also contributes to the protection of the eyeglass joint against damage.

In a further advantageous embodiment, it is provided that respective cone-shaped and/or hook-shaped retaining elements extend slanted towards the movement plane, in particular substantially orthogonally, and/or a plane defined by the ring shape of the spring element extends substantially parallel to the movement plane, extends in particular in the movement plane. Such a design of the eyeglass joint allows the creation of a particularly flat eyeglass joint. An eyeglass joint can be considered a flat eyeglass joint if it extends upwards very little along the of the wearer of eyeglasses with such a joint. The orthogonal extension to the movement plane can be particularly low. In particular, the minimum height of the eyeglass joint can thus be substantially predetermined only by the thickness of the spring element. If the plane defined by the ring shape of the spring element is aligned substantially transversely to the movement plane, however, the minimum height of the eyeglass joint can be substantially determined by the diameter of the ring shape of the spring element.

In particular, the alignment of the retaining elements can correspond to their longitudinal extension, which can correspond to a main extension direction. The alignment of the retaining elements and thus their extension can be determined, for example, by an extension orthogonally to a plane defined by a loop adjacent to the spring element. For example, the extension of the retaining elements can correspond to a longitudinal direction of a cylindrical portion of the retaining element to which the spring element is attached.

Preferably, the spring element is incorporated in respective recesses and/or grooves of the joint parts such that in the use position, the spring element is concealed by the joint parts from above, below and/or outside when the glasses with the eyeglass joint are worn.

Preferably, a cone-shaped and/or hook-shaped retaining element is formed on each joint part, which are aligned opposite to each other. wherein these are oppositely aligned. This can mean in particular that one retaining element at one top is connected to the joint part in one piece and the other retaining element is connected at its bottom. The retaining elements can thus be formed in such a way that the spring element is slid onto the retaining elements in two opposite directions. In the first retaining element, for example, the spring element is slid on from below and above it, the first joint part acts as a stop, while the spring element on the second retaining element is slid on from above and the second joint part acts as a stop below. Thus, the spring element is particularly securely attached to the respective retaining elements and cannot easily unintentionally be stripped off. In this connection, the terms above and below can again refer to the upward direction of the glasses with the eyeglass joint when worn.

In a further advantageous embodiment of the eyeglass joint it is provided that the spring element is arranged substantially on the sides of the joint parts facing an inner angle of the eyeglass joint in the stowage position, in particular, it is attached there. In addition, the respective retaining elements can also be arranged on these sides. The sides can also be referred to as inner sides, which are facing the head of the wearer when wearing the glasses according to the invention. Respective inner sides can be facing each other in the folded state of the eyeglass joint. Here, too, the respective retaining elements and/or spring elements are particularly well concealed when the glasses are worn. In addition, the retaining elements and the spring element are particularly well protected against contamination and damage from the outside. In particular, these parts are protected by the two joint parts in the folded state of the eyeglass joint, so that glasses with such a joint can be stowed without worries about damaging the spring element by getting parts caught, for example, on the edge of a case.

In a further advantageous embodiment of the eyeglass joint, it is provided that the receiving portion and/or the rolling portion has a sliding layer and/or at least a sliding sleeve and/or sliding layer is arranged between them. With a sliding layer for example in the form of a cured resin coating and/or a Teflon coating of the respective joint parts, the wear on the eyeglass joint can be particularly low. By using a sliding sleeve, the joint parts can be made of particularly soft materials, without the fear of wear on the eyeglass joint. In addition, the respective sliding properties of the respective contact surfaces can also be particularly good, so that friction and effort in the adjustment of the eyeglass joint can be reduced. Appropriate coatings and/or sleeves can also be used at contact points or surfaces between the spring element and the corresponding joint parts, for example on the retaining elements. This as well helps keep the wear on the eyeglass joint due to a relative movement of the spring element to the joint parts and the resulting friction very low. The sliding layer or sliding sleeve can, for example, be firmly connected to one of the two joint parts, for example by means of an adhesive bond. As a result, the eyeglass joint is particularly robust. The sliding layer or sliding sleeve can for example also just loosely be put onto one of the two joint parts or inserted. This makes assembly particularly fast and cost-effective. In addition, the sliding layer or sliding sleeve can also easily be replaced in the event of wear. The sliding layer or sliding sleeve can also be considered an intermediate part between the two sides of the joint or the two joint parts.

Preferably, the sliding layer and/or the sliding sleeve can also form the receiving portion and/or the rolling portion itself. For this purpose, the sliding layer can also be provided in a three-dimensional shape, for example by different thicknesses. In this case, the sliding layer and/or sliding sleeve can also be considered a part of the respective assigned joint part and/or preferably be firmly connected to it. For example, the sliding sleeve and/or the sliding layer can be provided flush to a remaining part of the respective joint part and form an end from the respective joint part facing the other joint part. The sliding sleeve and/or sliding layer can preferably also be colored, for example with paint or as a colored varnish, so that wear, for example due to abrasion, can be detected early. In addition, the color can also constitute a design element.

In a further advantageous embodiment of the eyeglass joint, it is provided that the receiving portion and/or the rolling portion are designed to effect a self-adjustment of the eyeglass joint by means of a spring force pressing the two portions against each other. For example, the spring element may have a preload, by means of which the two joint parts are tensioned against each other and which also presses the receiving portion against the rolling portion. Self-adjustment can mean a return to a predetermined starting position. For example, due to the geometry of the receiving portion and the rolling portion, and due to a tense spring element, the two joint parts can align in their spatial position to each other, thus automatically adjusting the eyeglass joint. For this purpose, two pairs of contact surfaces, which are transverse to each other, can be provided, on which the joint parts rest. At least one of the contact surfaces can be aligned transversely to a main extension axis of at least one of the two joint parts in the use position, and another of the contact surfaces can be aligned transversely to the main extension axis of at least one of the two joint parts in the stowage position. Alternatively, or additionally, the receiving portion can comprise a wedge-shaped segment and the rolling portion a corresponding recess. For example, a cuboid rolling portion and a corresponding receiving portion can cause a self-adjustment by means of the angled faces of each portion. Therefore, no deformation of the respective joint parts has to occur for joint adjustment, as is often the case with conventional hinge joints for glasses. In particular, the eyeglass joint can adjust itself in the stowage position and/or the use position, which is particularly advantageous for a space-saving storage of the glasses and/or for a comfortable use of the glasses.

In a further advantageous embodiment of the eyeglass joint, it is provided that the eyeglass joint is designed to allow a movement of the joint parts relative to each other in all degrees of freedom, wherein the joint parts are automatically moved back to a starting position in the movement plane by means of the spring element when deflecting from the movement plane and/or rotating around an axis, in particular in the movement plane. In particular, the starting position can be the stowage position and/or the use position, but also another position in the movement plane. The eyeglass joint thus makes it possible to accidentally move the two joints into a plane that deviates from the movement plane without damaging the eyeglass joint. Such an unintentional movement is substantially only limited by an elongation at break of the spring element and/or a structural overload of the respective joint parts, which can be predetermined, for example, by their strength. In particular, a rubber-elastic spring element can be deformed into all degrees of freedom and still automatically reverts back into its initial position. Similarly, it can be provided that the two joint parts are pulled apart relative to each other, which, unlike with a hinge joint, for example does not cause an axle pin to break, but initially only causes the spring element to be stretched reversibly.

The spring element can preferably also be formed such that the two joint parts can deflect and move as far as desired in any direction relative to each other. The spring element can for example be formed such that it can be elongated by at least 50%, preferably 100%, more preferred 200%, even more preferred 300%, and especially preferred at least 400%, from a starting position with the eyeglass joint in an open and/or closed position, or in the use position and/or stowage position. Accordingly, the eyeglass joint can be elongated almost at will and otherwise overstretched.

A respective geometric design of the rolling portion and/or the receiving portion can support a reset effect, for example by respective contact surfaces, which outside of the metastable positions are no longer substantially plane, and which together with the spring element-which was adjusted from these positions and has therefore been stretched further-cause a reset. All in all, an eyeglass joint can thus be formed which only comprises metastable positions in one plane for moving between the stowage position and the use position and which is otherwise automatically adjusted into this plane or in the stowage position and the use position by means of the spring element.

In a further advantageous embodiment of the eyeglass joint, the eyeglass joint is formed in such a way that the spring element automatically detaches from at least one of the joint parts when a maximum permissible range of movement in at least one degree of freedom is exceeded. The maximum permissible range of movement can be defined by the use position and/or the stowage position. For example, the maximum allowed range of movement can correspond to a movement in the movement plane between the stowage position and the use position. For example, at least one of the retaining elements on a joint part can be arranged such that the spring element slips from the retaining element when the maximum permissible range of movement is exceeded. For example, the retaining element may be aligned in such a way that, when the eyeglass joint is overstretched, the force generated by the stretching of the spring element causes the spring element to slip off the cone-shaped retaining element. Thus, the two joint parts detach from each other before the spring element is damaged due to an inadmissible elongation and/or before the joint parts are structurally overloaded by too strong a spring force. As a result, the eyeglass joint can be particularly well protected against damage. For this purpose, a specific geometry of the retaining elements can be provided, for example by corresponding curvatures and/or undercuts. The permissible movement range can be significantly larger than specified by the use position and the stowage position. This prevents the eyeglass joint from partially dismantling itself for protection even in the event of small exceedances. For example, in a movement of 20° or more beyond the use position in the movement plane, a detachment of the spring element from the retaining element can be provided so as to protect the eyeglass joint against damage.

In a further advantageous embodiment, it is provided that the spring element is detachably connected to the first joint part and/or the second joint part. This allows the spring element to be easily replaced and/or repaired. In particular, the eyeglass joint can be disassembled easily. With only one one-sided detachability, the eyeglass joint is particularly easy to handle, and the two joint parts are particularly easy to disassemble and reassemble. With a double-sided detachability, the design is particularly simple and respective spring elements can be replaced especially easily. For example, an annular rubber-elastic spring element can be simply mounted on two cone-shaped elements and also removed from them. Due to the detachability of the spring element, the respective joint parts can of course easily be replaced as well.

In a further advantageous embodiment of the eyeglass joint, it is provided that the first joint part and/or the second joint part at least have one recess, in particular a groove and/or a through opening, in which the spring element and/or respective retaining elements are at least partially arranged. As a result, the spring element can be safely incorporated and is thus particularly well protected against external damage. Likewise, respective retaining elements can for example be protected from breaking because they got caught on something, or from an inadmissible direct external load on the retaining elements. Loads to the retaining elements arranged in grooves can thus substantially only be applied by the spring element. A groove can form at least a part of a ring and/or a recess, in the center portion of which the retaining element is then arranged. In particular, the through opening prevents the spring element from detaching from both parts of the joint at the same time and thus being lost.

The spring element can be additionally supported in portions outside the retaining element by respective grooves, through openings and/or undercuts as well. This can ensure, for example, that even in the folded state, i.e. in the stowage position of the eyeglass joint, the spring element continues to exert a certain preload force, for example by predetermining a minimum radius for the curvature of the spring element. Thus, the spring element can for example follow a contour of the respective joint parts in the stowage position as well.

The groove can be provided on the inner side of the respective joint parts, in order to protect the spring element particularly well against damage. Alternatively, the groove can also be arranged in such a way that it can be seen when the glasses are worn. This also allows the spring element to be seen thus be used as a design element. In addition, it is easy to visually check damage to the spring element. However, when provided on the inner side of the joint part, the spring element is concealed and protected from environmental influences; in particular, only very little UV light reaches the spring element. A groove or recess and/or through opening can substantially be considered an extension of the spring element in the two joint parts. A recess or groove and/or through opening can be formed at least partially annularly and extend in a plane transversely, in particular orthogonally, to the movement plane.

In a further advantageous embodiment of the eyeglass joint, it is provided that the first joint part and/or the second joint part comprise at least one support element, in particular in the form of an undercut at a recess, on which the spring element is supported only in a certain joint position range. The support element may be used to ensure a minimum elongation of the spring element in a folded state of the eyeglass joint as well, and/or to effect a force deflection of the stretched spring element. Otherwise, when the two joint parts move towards each other during folding, there can be a direct connection between the two retaining elements, in particular spaced from a receiving portion or rolling portion, so that the spring element no longer exerts a sufficient preload force on the joint parts to hold them together almost gap-free. This way, it can for example be ensured that even in a folded position, the spring element and the two joint parts also substantially form a V-shape and that not only the joint parts form a V-shape with the spring element closing this V-shape to form a triangle.

In a further advantageous embodiment of the eyeglass joint it is provided that the joint parts are movably attached to each other by means of at least two spring elements attached to both joint parts. By providing two or more spring elements, they can assume separate functions at the eyeglass joint, and/or particularly strong preload forces and/or strong forces at a small elongation can be provided. For example, one spring element can substantially determine the preload in the stowage position and the other spring element the preload in the use position. As a result, the connection between the two joint parts can be differently rigid at different positions. In addition, different forces can be specified which are required to unfold or fold the eyeglass joint. In addition, the eyeglass joint can thus be configured with respect to the preloads in the various positions. Similarly, specific different angular ranges for the self-adjusting of the eyeglass joint can be predetermined by different spring elements.

In a further advantageous embodiment of the eyeglass joint, it is provided that the at least two spring elements are arranged together in a recess on the first joint part and/or the second joint part. The recess can be a groove as described above. Similarly, a support element as described above can then be provided, wherein only a first spring element is supported on this support element and the second spring element is supported on that support element via the first spring element. In the recess, the spring elements can be in contact. This makes the eyeglass joint especially compact despite the presence of several spring elements.

In a further advantageous embodiment of the eyeglass joint it is provided that at the same elongation, one of the at least two spring elements has a different tension than another of the at least two spring elements. This different tension can for example be provided by the use of a different material, the provision of a different modulus of elasticity, a different cross-section, a different heat treatment, a different pre-elongation, and/or differently unstretched lengths of the spring elements. As a result, the eyeglass joint can be configured especially well, in particular with regard to the preloads.

In a further advantageous embodiment of the eyeglass joint it is provided that the first joint part, the second joint part, and/or respective spring elements consist of natural materials, in particular of compressed wood, stone, horn, or rubber. In particular, the spring element can be made of natural rubber. Pressed wood can also be referred to as Panzerholz wood, which can be a wood layer structure with resin. Granite, marble or slate can for example be used as a stone. Rubber is a particularly suitable material for forming a rubber-elastic spring element. This allows the use of natural and/or renewable resources. In particular, the eyeglass joint can be free of metals, which makes it look particularly natural. And, in addition, no corrosion protection is required. Furthermore, the eyeglasses can easily be recycled for example by composting.

In a further advantageous embodiment of the eyeglass joint, it is provided that the first joint part is formed as the rim of the eyeglass frame and/or the second joint as an eyeglass temple of the eyeglass frame. Alternatively, however, the first joint part can be connected to the rim of the eyeglass frame and/or the second joint to the eyeglass temple of the eyeglass frame, for example by means of an adhesive bond and/or a screw connection. Preferably, however, the respective joint parts are formed as a single-piece and/or integrally formed with the rim and the temple of the eyeglass frame, respectively. As a result, no additional parts are needed. This way, the frame is particularly cost-effective to assemble and can thus be particularly small, light and robust.

A second aspect of the invention relates to a joint set for the configurable forming of an eyeglass joint according to the first aspect of the invention. Accordingly, the features and advantages resulting from the first aspect of the invention are to be inferred from the description of the first aspect of the invention, wherein advantageous embodiments of the first aspect of the invention are to be considered advantageous embodiments of the second aspect of the invention and vice versa.

The joint set preferably comprises several different spring elements, which can be selected for configuring the eyeglass joint to be formed, wherein the different spring elements differ in particular with respect to their tension at the same elongation and/or with respect to their length in an unstretched state. Alternatively, or additionally, the joint set comprises several different first joint parts and/or several different second joint parts, which can be selected for configuring the eyeglass joint to be formed, wherein the different first and/or different second joint parts differ in particular with regard to the geometry of their receiving portion or rolling portion.

Thus, the eyeglass joint can be adapted to the wishes of the user, for example regarding the stowage position and/or use position, the respective forces by means of which it moves automatically, such as reset forces, and required forces for opening and/or closing. In particular, the fact that the joint can also be assembled and disassembled by an eyeglass wearer without the help of an optician, allows the user to adapt an eyeglass joint to his own personal preferences. For example, the owner of the glasses can replace the spring element himself if the forces to open and close the glasses are too great for him. Likewise, the owner of the glasses can easily adjust the preload force with which the eyeglass temples are pressed to his head to hold the glasses. This can make wearing glasses easier for elderly and weak people, while a sufficient hold of the glasses can be provided for athletic people.

For example, the joint set can comprise several spring elements, each of which has a different rubber mixture and/or a differently unstretched length. Preferably, respective spring elements have the same cross-section, so that they always fit evenly into the joint parts and/or can be attached to the retaining elements. However, the cross-sections of the respective spring elements may also be different, for example, to make it easier to install in joint grooves and/or to increase the grip on the joint parts. In addition, different spring characteristic curves can be easily specified even if the same material is used. For example, the joint set may include several different rubbers and/or different joint parts. The respective spring elements can be firmly attached at least partially to one of the joint parts, so that the respective spring element can also be replaced together with an associated joint part.

If the joint parts are formed as a single piece with the rim and/or the eyeglass temples, the glasses can also be configured quickly and easily for different applications. For example, a rim with normal lenses can be replaced with a rim with reading lenses. In the same way, the eyeglass temples for normal wear can be exchanged for eyeglass temples for a sports application. The joint set can be designed for a home user, for example, the specific owner of glasses. In particular, it is not necessary to consult an optician for configuring the eyeglass joint, and/or to use any tools, in particular special tools.

However, a special tool associated with the eyeglass joint can also be provided to further facilitate assembly and maintenance. In particular, the tool may be designed to pull the spring element off the respective retaining elements and/or to thread it onto them. The tool can consist of a material that is softer than the material of the joint parts but harder than the material of the spring element to protect the joint parts against damage during assembly and/or maintenance. For example, the tool may be formed like a slotted screwdriver, whose width is smaller than or substantially equal to the width of a groove in which the spring element is arranged on the respective joint parts.

Alternatively, or additionally, the joint set can also include a tool, in particular a special tool, which is intended for loosening the spring element from the joint parts. For example, the tool can have a tool head, which can be inserted into a recess between the spring element and a retaining element, in order to be able to remove the spring element from the retaining element without damaging the any parts.

In a further advantageous embodiment of the joint set, respective spring elements are color-coded and/or respective different joint parts are color-coded. For example, a first and a second joint part, which belong together, can have the same color configuration so that both eyeglass joints of a pair of glasses match. Likewise, the color-coding can indicate the properties of a spring element. For example, a first, red rubber-elastic spring element may have a stronger preload force at the same elongation as a second, blue rubber-elastic spring element. Preferably, the joint set is always designed to form two identical eyeglass joints. That is, every second joint part and/or each spring element is preferably present twice in the joint set. On the other hand, the first joint part can for example be formed together with the rim—wherein a first joint part on the rim is of course provided for each eyeglass temple—and only one rim is present in the joint set in order to save costs.

A third aspect of the invention relates to an eyeglass frame with a rim for at least one lens and two eyeglass temples. Furthermore, the eyeglass frame according to the third aspect of the invention comprises two eyeglass joints according to the first aspect of the invention, wherein these may be formed from a joint set according to the second aspect of the invention, wherein each eyeglass temple is movably connected to the rim by means of one of the two eyeglass joints. The eyeglass frame according to the third aspect of the invention can therefore comprise a eyeglass joint according to the first aspect of the invention, wherein this eyeglass joint can be configured from a joint set according to the second aspect of the invention. The features and advantages resulting from the use of the eyeglass joint according to the first aspect of the invention and the joint set according to the second aspect of the invention are to be inferred from the descriptions of the first or the second aspect of the invention, wherein advantageous embodiments of the first and second aspects of the invention are to be considered advantageous embodiments of the third aspect of the invention and vice versa. The two eyeglass joints can be formed symmetrically with respect to a vertical median plane of the glasses.

The first joint part can be formed as a rim of the eyeglass frame and/or the second joint part as a temple of the eyeglass frame. Alternatively, each second joint part can be firmly connected to each of an eyeglass temple, for example glued or integrally formed, for example as a further layer of a Panzerholz wooden eyeglass temple. Each first joint part can be firmly connected to the rim at opposite sides or ends, for example glued or integrally formed, for example as a further layer of a Panzerholz wooden eyeglass frame. Preferably, two lenses are held in the rim of the eyeglass frame, in particular for the optical correction of a visual impairment of an eyeglass wearer.

A fourth aspect of the invention relates to an eyeglass frame set with at least two rims for at least one lens and/or at least two pairs of eyeglass temples, wherein an eyeglass frame can be assembled by means of a selected pair of eyeglass temples and by means of a selected frame from the eyeglass frame set, wherein in the assembled state, each selected eyeglass temple is movably connected to the selected rim by means of an eyeglass joint according to the first aspect of the invention, with each rim of the eyeglass frame set comprising a corresponding first joint part and each eyeglass temple of the eyeglass frame set comprising a corresponding second joint part. The eyeglass frame set can also comprise a joint set according to the second aspect of the invention, in order to form an eyeglass joint according to the first aspect of the invention.

Since the eyeglass joint is also easy to assemble and disassemble by a home user, an eyeglass frame set can be provided, by means of which a pair of glasses can be freely configured according to the user's wishes. For example, several rims and/or several pairs of eyeglass temples can be provided, so that depending on the application, sports glasses, reading glasses, or a normal set of glasses in the conventional sense can be assembled. For example, the owner of the eyeglass frame set can have a rim and two pairs of eyeglass temples. The first pair of eyeglass temples, for example, is particularly comfortable and intended for everyday use. The second pair of eyeglass temples, for example, offers a particularly secure grip, so that the glasses, or rather the same frame, can also be used for a type of sport involving a lot of movement. It is then not necessary to provide two separate rims, and in particular two separate pairs of glasses. This means, for example, that there is no need to purchase two sets of expensive prescription glasses for optically correcting the visual impairment of the wearer. A color-coding system can also advantageously be provided together with the eyeglass frame set.

The rims and eyeglass temples can have common dimensions of glasses for optical correction and/or for sun protection. The spring element can, for example, have an inner diameter and/or a length of 2 mm to 35 mm in the unstretched state, preferably 3.5 mm to 8 mm. In a spring element with a closed annular shape, the length can also accordingly be defined as the diameter between two opposite sides in the unstretched state. A diameter of a cross-section of the spring element can for example be 0.5 mm to 5 mm, preferably 1.5 mm to 3 mm. The spring elements can for example be formed like O-rings.

A fifth aspect of the invention relates to the use of a spring element which preferably has a closed annular shape and/or is rubber-elastic. This spring element can be used in an eyeglass joint according to the first aspect of the invention and/or in a joint set according to the second aspect of the invention and/or in an eyeglass frame according to the third aspect of the invention and/or in an eyeglass frame set according to the fourth aspect of the invention. This results in the advantages according to the previously described aspects of the invention.

Another aspect is directed to eyeglasses with at least one eyeglass joint according to the first aspect of the invention. The eyeglasses can comprise a corresponding frame and at least one lens for correcting optical errors and/or for sun protection.

Additional possible designs and features of the invention can be inferred from the following list of aspects:

1. Eyeglass joint (10, 50, 100, 150, 200) for an eyeglass frame with a first joint part (12) assigned to a rim of the eyeglass frame, and a second joint part (14) assigned to an eyeglass temple of the eyeglass frame, wherein the joint parts (12, 14) are movably connected to each other by means of at least one spring element (16, 102, 104, 216) attached to both joint parts (12, 14), wherein the spring element (16, 102, 104, 218) preferably has a closed annular shape and/or is rubber-elastic.

2. Eyeglass joint (10, 50, 100, 150, 200) according to aspect 1, wherein
   at least one of the joint parts (12, 14), preferably both joint parts (12, 14), each comprise a preferably cone-shaped and/or hook-shaped (72) retaining element (18, 218), around which the spring element (16, 102, 104, 216) is at least portion-wise looped.

3. Eyeglass joint according to aspect 2, wherein
   at least one of the joint parts (12, 14) comprises several spaced retaining elements (18, 218) for attaching the spring element (16, 102, 104, 216) at different positions on this joint part (12, 14).

4. Eyeglass joint (10, 50, 100, 150, 200) according to one of the preceding aspects, wherein
   the two joint parts (12, 14) are tensioned against each other by the spring element (16, 102, 104, 216) such that they are movably connected.

5. Eyeglass joint (10, 50, 100, 150, 200) according to one of the preceding aspects, wherein
   one of the joint parts (12, 14) comprises a receiving portion (24) on which a corresponding rolling portion (22) of the other one of the joint parts (12, 14) rolls and/or slides during a joint movement.

6. Eyeglass joint (10, 50, 200) according to aspect 5, wherein
   the receiving portion (24) and/or the rolling portion (22) each comprise at least two support surfaces (36), in particular substantially flat support surfaces (36), which are at an angle (a) of between 75° and 105° to one another, preferably between 87° and 93°.

6a. Eyeglass joint (10, 50, 200) according to aspect 6, wherein
   both contact surfaces are provided inclined to the main extension axis of the two joint parts, and/or to the longitudinal axis of the respective eyeglass temple in a use position and/or a stowage position, in particular when viewed perpendicularly to the movement plane.

7. Eyeglass joint (10, 50, 100, 150, 200) according to one of the preceding aspects, wherein
   the eyeglass joint (10, 50, 100, 150, 200) is configured such that one of the joint parts (12, 14) can move relatively to the other one of the joint parts (12, 14) substantially in a movement plane such that the eyeglass joint (10, 50, 100, 150, 200) can be adjusted between a stowage position and a use position of the eyeglass frame (10, 50, 100, 150, 200).

8. Eyeglass joint (10, 50, 100, 150, 200) according to one of the preceding aspects, wherein
   the two joint parts (12, 14) are at least partially connected relative to each other via the receiving portion (24) and the corresponding rolling portion (22) in the movement plane.

9. Eyeglass joint (10, 50, 100, 150, 200) according to any of aspects 7 or 8, wherein the joint parts (12, 14), in particular the receiving portion (24) and/or the rolling portion (22), are configured to stabilize the eyeglass joint (10, 50, 100, 150, 200) in the stowage and/or the use position, in particular by means of at least one stop (28, 52, 110) and/or engaging surfaces (36) at the receiving portion (24) and/or rolling portion (22).

10. Eyeglass joint (10, 50, 100, 150, 200) according to any of aspects 7 to 9, wherein the eyeglass joint (10, 50, 100, 150, 200) is configured to automatically adjust to the stowage position in a first joint position range, in particular a first angular range in the movement plane, by means of the spring element (16, 102, 104, 216)
   and/or
   the eyeglass joint (10, 50, 100, 150, 200) is configured to automatically adjust to the use position in a second joint position range, in particular a second angular range in the movement plane, by means of the spring element (16, 102, 104, 216).

11. Eyeglass joint (10, 50, 100, 150, 200) according to any of aspects 7 to 10, wherein the eyeglass joint (10, 50, 100, 150, 200) is configured to allow a movement of the joint parts (12, 14) relative to each other in the movement plane beyond the stowage position and/or beyond the use position, wherein the eyeglass joint (10, 50, 100, 150, 200) is configured such that it automatically returns to the stowage position and the use position, respectively, by means of the spring element (16, 102, 104, 216).

12. Eyeglass joint (10, 50, 100, 150) according to any of aspects 7 to 11, wherein
   respective cone-shaped and/or hook-shaped retaining elements (18) extend substantially in the movement plane, and/or a plane defined by the ring shape of the spring element (16, 102, 104) extends transversely to the movement plane, in particular orthogonally.

12a. Eyeglass joint (200) according to any of aspects 7 to 11, wherein
   respective cone-shaped and/or hook-shaped retaining elements (218) extend slanted towards the movement plane, in particular substantially orthogonally, and/or a plane defined by the ring shape of the spring element (216) extends substantially parallel to the movement plane, in particular in the movement plane.

13. Eyeglass joint (10, 50, 100, 150, 200) according to any of aspects 7 to 12 or 12a, wherein
   the spring element (16, 102, 104, 216) is provided substantially on the sides of the joint parts (12, 14) facing an inner angle of the eyeglass joint (10, 50, 100, 150, 200) in the stowage position, in particular, it is attached there.

14. Eyeglass joint (10, 50, 100, 150, 200) according to any of aspects 7 to 13, wherein
the receiving portion (24) and/or the rolling portion (22) comprise a sliding layer (308) and/or at least one sliding sleeve and/or sliding layer (308) is provided in between.

15. Eyeglass joint (10, 50, 100, 150) according to any of aspects 7 to 14, wherein
the receiving portion (24) and/or the rolling portion (22) are configured to effect a self-adjustment of the eyeglass joint (10, 50, 100, 150, 200) when they are subjected to a spring force pressing the two portions against each other, in particular in the stowage position and/or the use position.

15a. Eyeglass joint (10, 50, 100, 150) according to aspect 15, wherein
the receiving portion comprises a V-shaped or wedge-shaped segment and the rolling portion comprises a corresponding recess, wherein the angle bisector of the V shape or the wedge shape extends substantially parallel to a main extension direction of a joint part and/or the longitudinal axis of an eyeglass temple.

16. Eyeglass joint (10, 50, 100, 150, 200) according to any of the preceding aspects, wherein
the eyeglass joint (10, 50, 100, 150, 200) is configured to allow a movement of the joint parts (12, 14) relative to each other in all degrees of freedom, wherein the joint parts (12, 14) are automatically moved back to an original position in the movement plane by means of the spring element (16, 102, 104, 216) when they deflect from the movement plane and/or rotate around an axis in the movement plane.

17. Eyeglass joint (10, 50, 100, 150, 200) according to any of the preceding aspects, wherein
the eyeglass joint (10, 50, 100, 150, 200) is configured such that the spring element (16, 102, 106, 216) automatically detaches from at least one of the joint parts (12, 14) when a maximum permissible movement range is exceeded in at least one degree of freedom.

18. Eyeglass joint (10, 50, 100, 150, 200) according to any of the preceding aspects, wherein
the spring element (16, 102, 104, 216) is detachably connected with the first joint part (12) and/or the second joint part (14).

19. Eyeglass joint (10, 50, 100, 150, 200) according to any of the preceding aspects, wherein
the first joint part (12) and/or the second joint part (14) comprise at least one recess (34, 106), in particular a groove (34, 106) and/or a through opening, in which the spring element (16, 102, 104, 216) and/or respective retaining elements (18, 218) are at least partially arranged.

20. Eyeglass joint (10, 50, 100, 150, 200) according to any of the preceding aspects, wherein
the first joint part (12) and/or the second joint part (14) comprise at least one support element (54), in particular in the form of an undercut (54) at a recess (34), on which the spring element (16, 216) is supported only in a certain joint position range.

21. Eyeglass joint (100, 150) according to any of the preceding aspects, wherein
the joint parts (12, 14) are movably connected to each other by means of at least two spring elements (102, 104), each attached to both joint parts (12, 14).

22. Eyeglass joint (100, 150) according to aspect 21, wherein
the at least two spring elements (102, 104) are arranged together in a recess (106) on the first joint part (12) and/or the second joint part (14).

23. Eyeglass joint (100, 150) according to any of aspects 21 or 22, wherein
at the same elongation, one of the at least two spring elements (102, 104) has a different tension than another of the at least two spring elements (102, 104).

24. Eyeglass joint (10, 50, 100, 150, 200) according to any of the preceding aspects, wherein
the first joint part (12), the second joint part (14), and/or respective spring elements (16, 102, 104, 216) consist of natural materials, in particular of compressed wood, stone, horn, or rubber, wherein the spring element (16) preferably consists of natural rubber.

25. Eyeglass joint (10, 50, 100, 150, 200) according to any of the preceding aspects, wherein
the first joint part (12) is formed as a rim of the eyeglass frame and/or the second joint part (14) is formed as a temple of the eyeglass frame.

26. Joint set for the configurable forming of an eyeglass joint (10, 50, 100, 150, 200) according to any of the preceding aspects, wherein
the joint set comprises several different spring elements (16, 102, 104, 216) which can be selected to configure the eyeglass joint to be formed (10, 50, 100, 150, 200), wherein the different spring elements (16, 102, 104, 216) differ in particular in their tension at the same elongation and/or in their length in an unstretched state,
and/or
the joint set comprises several different first joint parts (12) and/or several different second joint parts (14) which can be selected to configure the eyeglass joint to be formed (10, 50, 100, 150, 200), wherein the different first and/or the different second joint parts (12, 14) differ in particular in the geometry of their receiving portion (24) and/or their rolling portion (22).

27. Joint set according to aspect 26, wherein
respective different spring elements (16, 102, 104, 216) are color-coded and/or
respective different joint parts (12, 14) are color-coded.

28. Eyeglass frame comprising a rim for at least one lens, two eyeglass temples and two eyeglass joints (10, 50, 100, 150, 200) according to any of the preceding aspects, wherein each eyeglass temple is movably connected with the rim via one of the two eyeglass joints (10, 50, 100, 150, 200).

29. Eyeglass frame set comprising at least two rims for at least one lens each, and/or at least two pairs of eyeglass temples, wherein an eyeglass frame can be configured from a selected pair of eyeglass temples and a selected rim from the eyeglass frame set, wherein in the mounted state each selected eyeglass temple is movably connected with the selected rim via an eyeglass joint (10, 50, 100, 150, 200) according to any of the preceding aspects, and wherein each rim of the eyeglass frame set comprises a corresponding first joint part (12) and each eyeglass temple of the eyeglass frame set comprises a corresponding second joint part (14).

30. Use of a spring element (16, 102, 104, 216), in particular a closed annular shape and/or rubber-elastic spring element, in an eyeglass joint (10, 50, 100, 150,

200) according to any of aspects 1 to 25, and/or a joint set according to any of aspects 26 or 27, and/or an eyeglass frame according to aspect 28, and/or an eyeglass frame set according to aspect 29.

BRIEF DESCRIPTION OF THE DRAWINGS

Further embodiments of the invention are described in the claims, the examples and the drawings. The features and feature combinations mentioned in the description above, as well as the features and feature combinations mentioned in the examples below, cannot only be realized in the specific mentioned combinations, but also in other combinations without extending beyond the scope of the invention.
In the Drawings.

DETAILED DESCRIPTION

In the following, various embodiments of an eyeglass joint for an eyeglass frame will be discussed. Parts with the same function and/or identical design are partly assigned identical reference numbers and subsequently, redundant descriptions for each embodiment are left out.

Figure 1:
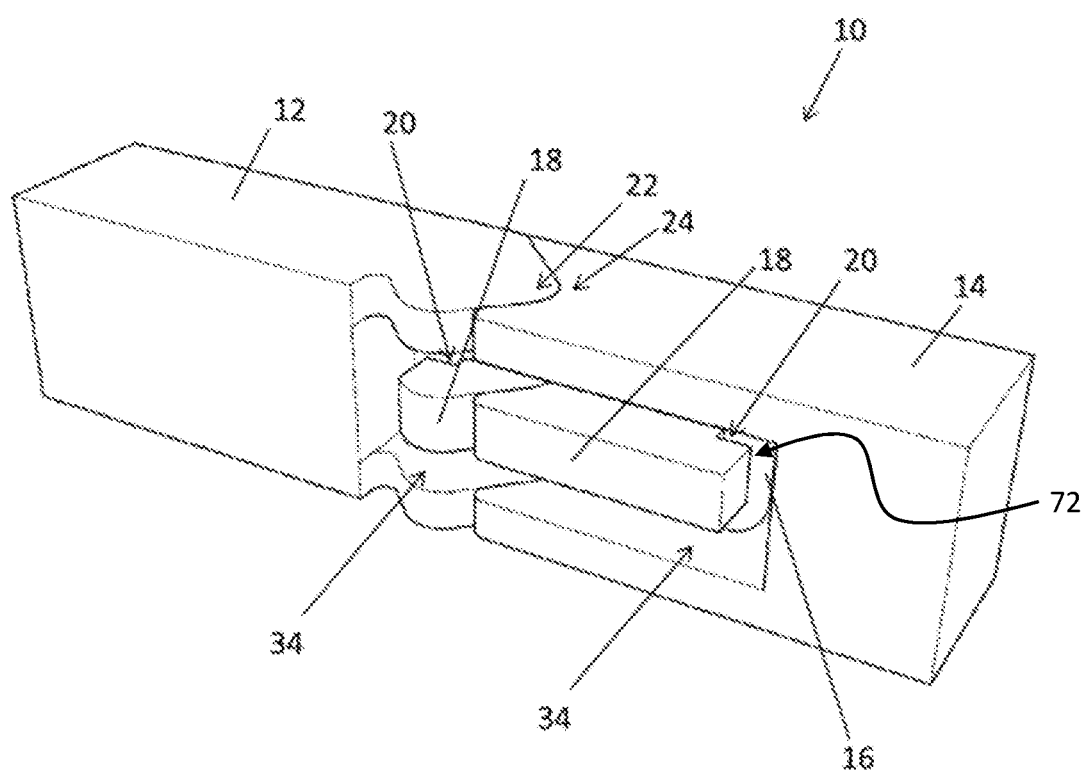
FIG. 1 shows a schematic perspective view of a first embodiment of a eyeglass joint for a eyeglass frame in its a use position.

FIG. 1 shows a schematic perspective view of a first embodiment of an eyeglass joint 10 for an eyeglass frame. The eyeglass joint comprises a first joint part 12, which is assigned to a frame of the eyeglass frame. Furthermore, the eyeglass joint 10 comprises a second joint part 14, which is assigned to an eyeglass temple of the eyeglass frame. However, this assignment can easily be exchanged without restricting the functionality of the respective eyeglass joints.

For example, the first joint part 12 may be formed integrally with the rim of the eyeglass frame, wherein the rim serves to hold the respective lenses of eyeglasses and at least a partial portion of which rests on the nose of the wearer when the glasses are worn. The second joint part 14 can also be formed integrally with an eyeglass temple and serves to hold the eyeglass frame on the head of the wearer. For example, both the first joint part 12 and the second joint part 14 can uniformly consist of a single material, such as wood, in particular compressed wood, Panzerholz wood, stone, horn, plastic, and/or metal. Accordingly, the rim and the respective eyeglass temples can be made of the same material.

The two joint parts 12, 14 are movably connected by means of a spring element 16 attached to the two joint parts 12, 14. The spring element 16 of the present invention has a closed annular shape and is formed from a rubber-elastic material. For example, different types of rubber are suitable as a material for the spring element 16. The spring element 16 is provided on a retaining element 18 on each of the two joint parts 12, 14. The two retaining elements 18 comprise an undercut 20 on the sides facing away from each other, which prevents the spring element 16 from slipping off the retaining elements 18. By means of the spring element 16, the two joint parts 12, 14 are tensed against each other in a contact area. For this purpose, the spring element 16 is attached to the two retaining elements 18 with a certain preload. That is, the spring element 16 is stretched compared to an unstressed, loose state.

Except by the spring element 16, the two joint parts 12, 14 are not connected to each other. Since the spring element 16 is elastic, it allows the relative movement of the two joint parts 12, 14 basically in all degrees of freedom. In particular, the two joint parts 12, 14 can be adjusted between a use position, in which respective eyeglass temples are folded away from the frame and the glasses can be placed on the head of a wearer, and a stowage position, in which the eyeglass temples are substantially in contact with the rim of the eyeglass frame or folded towards the respective lenses.

Figure 2:
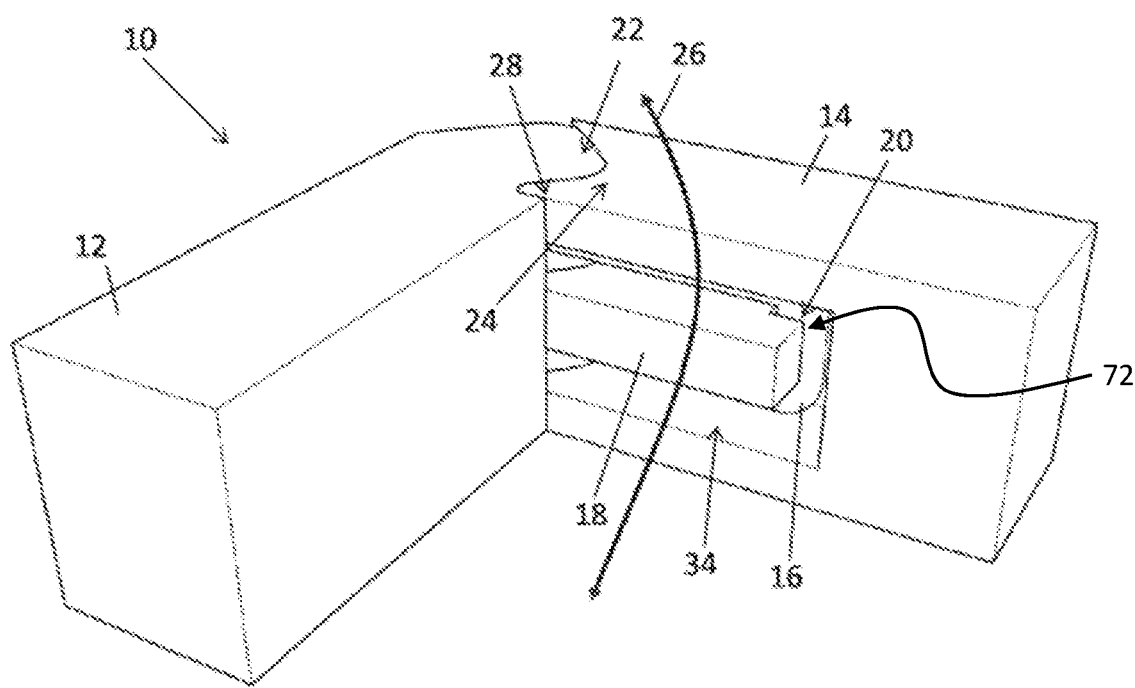
FIG. 2 shows a schematic perspective view of the eyeglass joint according to FIG. 1 in its stowage position.

The stowage position of the eyeglass joint 10 can for example be seen in the schematic perspective view of FIG. 2, wherein the two joint parts 12, 14 are rotated relative to each other by 90° in a movement plane compared to the use position shown in FIG. 1. In order to guide the movement of the two joint parts 12, 14 relative to each other at least partially, the first joint part 12 has a rolling portion 22 and the second joint part 14 has a corresponding receiving portion 24. As can be seen in FIGS. 1 and 2, as well as in the schematic views according to FIGS. 3 and 4, the rolling portion 22 is substantially cube-shaped or cuboid. Accordingly, the receiving portion 24 comprises a corresponding recess with a rectangular cross-section. Any corners are rounded in order to allow as uniform a smooth sliding and/or rolling of the two joint parts 12, 14 against each other as possible. Due to the corresponding cuboid formation of the rolling portion and the receiving portion, at least two pairs of corresponding support surfaces 36, 22 are provided, which when resting on each other form the stowage position or the use position, as described below. The respective support surface pairs are preferably formed in the cuboid embodiment at an angle and are for example substantially offset by 90° to each other.

The receiving portion 24 and the rolling portion 22 form a kind of guide for the eyeglass joint 10. In particular, these two portions 22, 24 stabilize the joint parts 12, 14 with respect to a tilting movement upwards or downwards, which is for example illustrated in FIG. 2 by the arrow 26. This ensures that the eyeglass joint 10 can be conveniently adjusted between the use position and the stowage position without the eyeglass joint being inadvertently twisted in a different spatial direction.

The two holding elements 18 each form a part of the rolling portion 22 and the receiving portion 24 and each have contact surfaces facing each other.

Since the two joint parts 12, 14 are held together only by the spring element 16, a movement of, for example, the second joint part 14 relative to the first joint part 12 in the direction of movement illustrated by the arrow 26 is quite possible. The eyeglass temple can thus be bent upwards or downwards in relation to the rim, wherein respective spatial orientations are to be understood according to a wearing position of the eyeglass frame on the head of the wearer. This allows the eyeglass joint 10 to be protected against damage if unintentional forces act on one of the two joint parts 12, 14 in the upward direction.

Due to the respective flat support surfaces in the upward direction at the rolling portion 22 and the receiving portion 24, and a further elongation of the spring element 16 resulting from such a movement, a resetting force is generated, which automatically adjusts the respective joint parts 12, 14 of the eyeglass joint 10 back into the movement plane between the use position and the stowage position. This movement plane is substantially horizontal with respect to a carrying position of a wearer standing upright. Thus, the eyeglass joint is particularly robust and easy to handle.

Furthermore, it can be seen that the rolling portion 22 and the receiving portion 24 in the section 28 form a stop 28, by means of which the stowage position is predetermined as a resting position. Due to the preload of the spring element 16, the eyeglass joint 10 will automatically engage back into the stowage position after an adjustment from the use position by a certain angle range or into a certain joint position range. Subsequently, the eyeglass joint 10 is automatically held in the stowage position by the spring element 16 on the stop 28. Thus, a metastable position is provided, which the eyeglass joint or respective joint parts 12, 14 only leave if an external force with a certain minimum strength is exerted. The angular range, from which the eyeglass joint 10 automatically engages into the stowage position, is substantially specified by the flat surfaces of the cubic shape of the receiving portion 24 and the rolling portion 22. For example, after passing a specific corner of the receiving portion 24 at a corresponding corner of the rolling portion 22, the eyeglass joint 10 engages from one position to the other.

Similarly, the eyeglass joint 10 also has a metastable position in the use position. For example, in the top view of FIG. 3, it can especially clearly be seen that the receiving portion 24 with two flat or plane surfaces 36 is in contact with the corresponding flat surfaces of the rolling portion 22. In this position, the spring element 16 can for example have its least elongation. Thus, for adjusting the eyeglass joint 10 from the use position, an increased tensile force is automatically generated by the spring element 16, which first causes a resetting force back into the use position. The use position is specified by the geometry of the rolling portion 22 and the receiving portion 24. In particular, the angled flat surfaces 36 create a stable position of the two joint parts 12, 14 to each other in the use position. The eyeglass joint 10 also automatically engages into the use position at a certain angle range, with the surfaces 36 serving engaging surfaces and ensuring a stable position of the two joint parts 12, 14 to each other.

Figure 3:
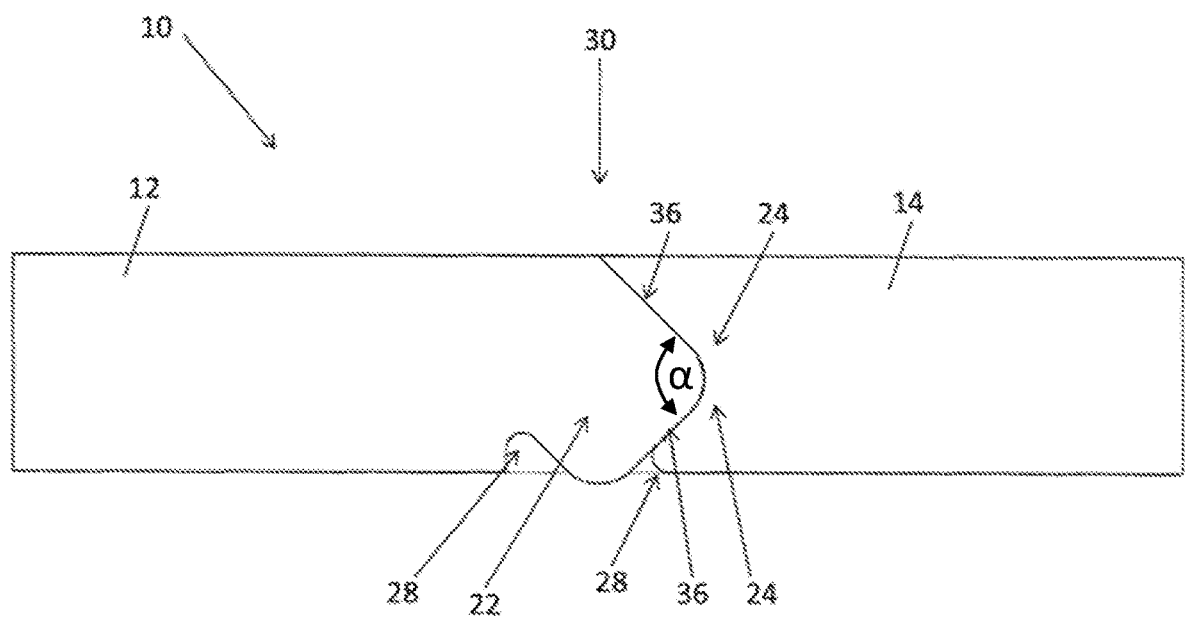
FIG. 3 shows a schematic top view of the eyeglass joint according to FIG. 1 in its use position.

Furthermore, FIG. 3 also shows that the rolling portion 22 and the receiving portion 24 are beveled when viewed from the direction of the arrow 30. The arrow 30 illustrates from which direction the eyeglass joint 10 is substantially seen by another person, as long as an eyeglass frame provided with it is worn by a user. In other words, the direction of view extends, for example, vertically to the longitudinal direction of an eyeglass temple. Accordingly, a possible gap between the two joint parts 12, 14 is concealed by a bevel. As a result, potential manufacturing tolerances can be particularly large, as no unsightly gap can be seen. In addition, the two joint parts 12, 14 are also pressed against each other by the spring element, so that the lowest possible gap is adjusted automatically.

In addition, this arrangement results in a V-shaped hold, by means of which the joint parts can be kept stable.

Figure 4:
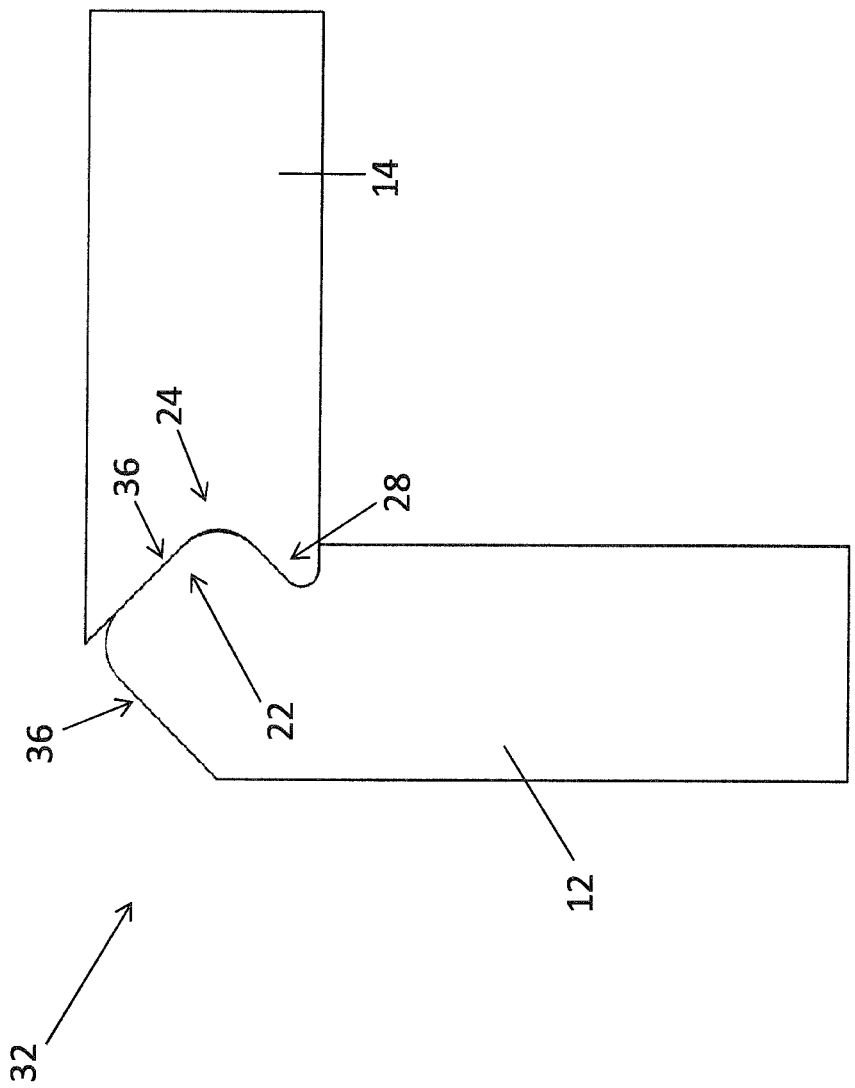
FIG. 4 shows a schematic top view of the eyeglass joint according to FIG. 1 in its stowage position.

In the top view of the eyeglass joint 10 according to FIG. 4, it is further shown that an portion 32 facing away from an inner angle of the eyeglass joint 10 in the stowage position has no overlap between the first and the second joint part 12, 14. This makes it possible for the eyeglass joint 10 to be folded even further without causing a structural load of adjacent portions of the two joint parts 12, 14. In particular, no contact area experiences any tensile load; instead the two joint parts 12, 14 roll on each other at the stop 28 when the eyeglass joint 10 is compressed over such a predetermined portion. In the portion 32, the two joint parts 12, 14 can withdraw from each other in order to structurally relieve the eyeglass joint 10. Thus, the eyeglass joint 10 is also protected against damage. Usually, a spring element 16 can easily be designed to be stretched further without being damaged while still providing enough preload force.

The spring element 16 is detachably connected to the two retaining elements 18 or to the two joint parts 12, 14. Thus, it is possible, in particular, to replace the spring element 16 with another spring element with a different spring characteristic curve. For example, spring elements 16 consisting of from different rubber compounds can be provided, whereby these different spring elements generate different forces at the same elongation. Thus, one the one hand, depending on the used spring element, a different force can be specified with which the eyeglass joint 10 engages into the use position and/or the stowage position, respectively, and in addition, which corresponding force is needed to adjust the eyeglass joint 10 between these positions. Likewise, it can also be provided that a certain force is necessary to keep the eyeglass joint 10 in the use position. Thus, it can be effected that respective eyeglass temples are pressed to the head of a wearer in order to help hold a corresponding eyeglass frame to the head of the wearer.

The eyeglass joint 10 can easily be assembled and disassembled. In particular, it can be possible to assemble the eyeglass joint 10 without additional tools and/or training. This also makes it possible for a home user to replace individual parts of the eyeglass joint 10, such as the spring element 16. The eyeglass joint 10 adjusts itself via the receiving portion 24 and the rolling portion 22 as well as the spring element 16, so that no further fine adjustments and adjustments of the eyeglass joint 10 to its wearer by permanent deformation of respective parts of the eyeglass joint 10 are necessary. As a result, the eyeglass joint 10 can also be configured by a home user.

As is shown in particular in FIGS. 1 and 2, the two joint parts 12, 14 each comprise a groove 34, in which the spring element 16 is arranged. Thus, the spring element 16 is recessed against the respective outer surfaces of the two joint parts 12, 14, which on the one hand protects the spring element 16 against damage, and on the other hand, also prevents hair from getting caught in the spring element 16. The grooves 34 can also be understood as recesses in the two joint parts 12, 14, in the center portion of which the corresponding holding elements 18 are arranged. The grooves 34 and/or the retaining elements can be manufactured by milling the respective joint part blanks, in particular Panzerholz wood blanks.

The groove 34 on the first joint part 12 is designed in such a way that in the stowage position, it is no longer accessible from the outside at the eyeglass joint 10. This can be seen in particular in FIG. 2. Thus, the spring element 16 is protected from slipping out of the groove 34 or from sliding off the retaining element 18 on the first joint part 12 in the stowage position. This is particularly useful if the spring element 16 is less stretched in the stowage position than in the use position, as is the case in the present case. If the stretch ratios are reversed, a reverse construction or a blocking of the groove 34 on the first and/or second joint part 14 in the use position can also be provided: In that case, the groove 34 of the second joint part 14 can for example be covered in the use position.

As can be seen in FIG. 1, is recognizable, the holding element 18 at the second joint part 14 of the eyeglass joint 10 extends further away from the respective contact surfaces of the two joint parts 12, 14 than the holding element 18 of the first joint part 12. This makes it possible to take into account that there is more assembly space on an eyeglass temple than on a rim, since the rim also has to accommodate the respective lenses and also usually has a curvature of approx. 90° as it meets the first joint part 12. With this wide extension of the spring element 16 at the second joint part 14, a longer spring element 16 can be used. When a longer spring element 16 is used, it is stretched, or elongated, less in terms of its total length than a correspondingly shorter spring element during a movement of the eyeglass joint 10. As a result, the spring element 16 is less stressed overall. In particular, the rubber-elastic material from which the spring element 16 is formed will not experience material fatigue until after a high number of joint movements.

Figure 5:
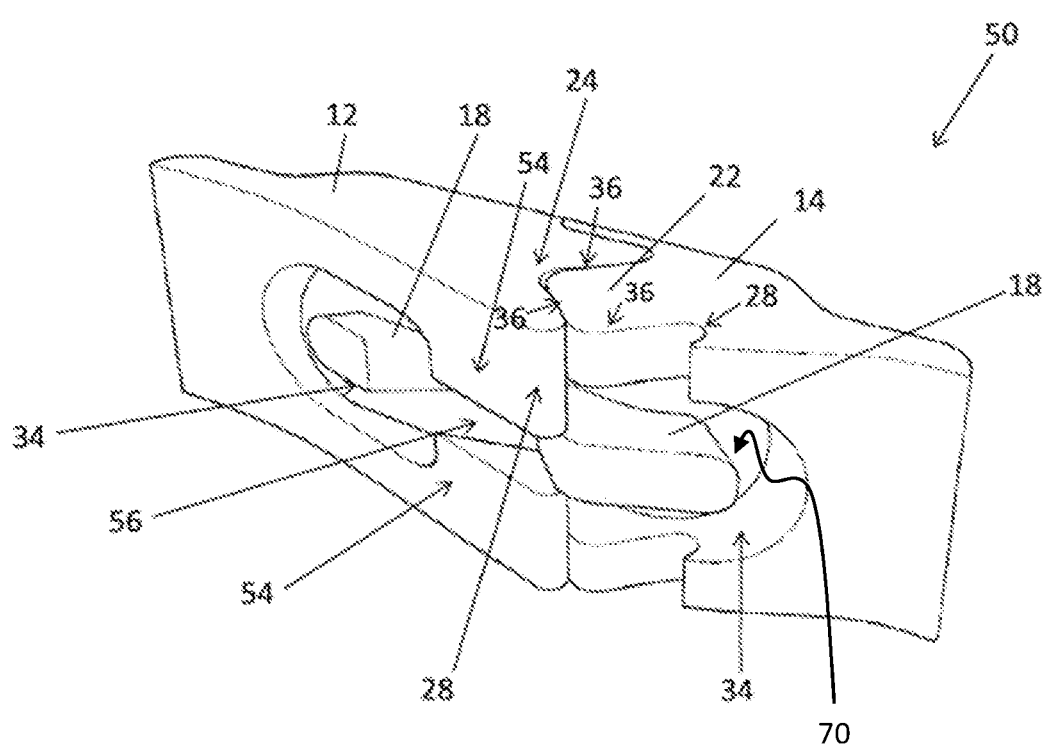
FIG. 5 shows a schematic perspective view of a further embodiment of an eyeglass joint in its use position.

In a schematic perspective view, FIG. 5 shows a second version of the eyeglass joint, wherein it is provided with the reference number 50. In the eyeglass joint 50, the rolling portion 22 is arranged on the second joint part 14 and the receiving portion 24 on the first joint part 12. Thus, the arrangement is reversed compared to the eyeglass joint 10. Alternatively, the joint part 12 can also be assigned to the eyeglass temple and the joint part 14 to the rim. In that case, FIG. 5 shows, for example, a left eyeglass joint 50, while FIG. 1 shows a right eyeglass joint 10. Respective left and right eyeglass joints are preferably formed symmetrically with respect to a mirror axis through the center of a rim.

Figure 6:
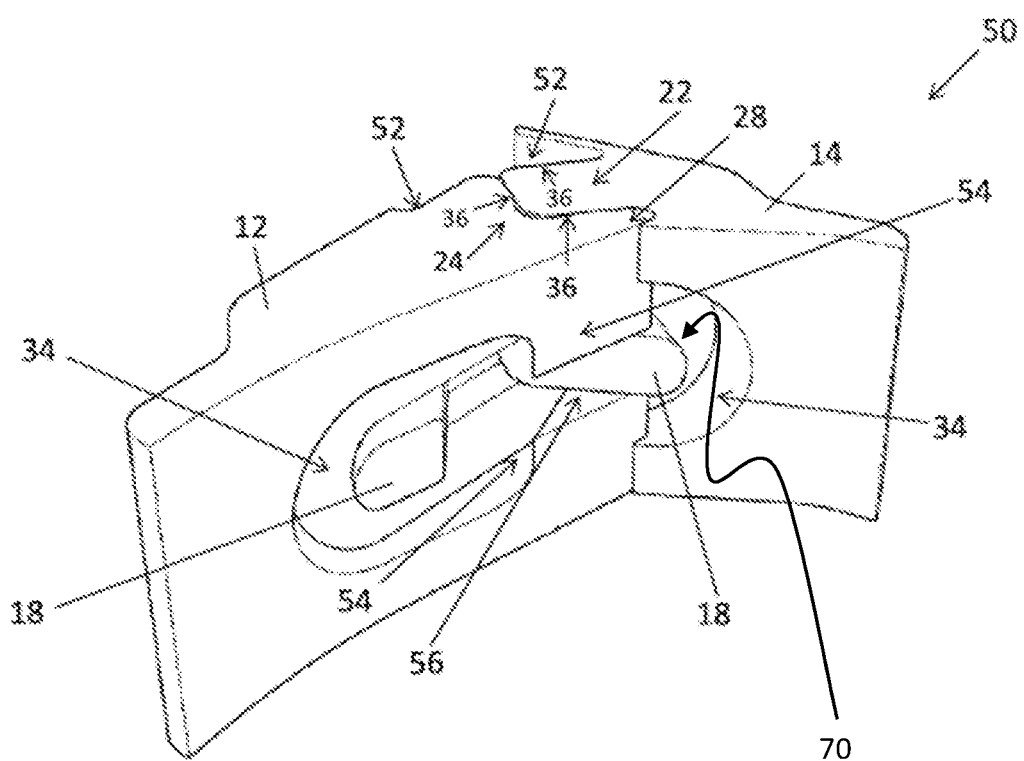
FIG. 6 shows a schematic perspective view of the eyeglass joint according to FIG. 5 in its stowage position.
Figure 7:
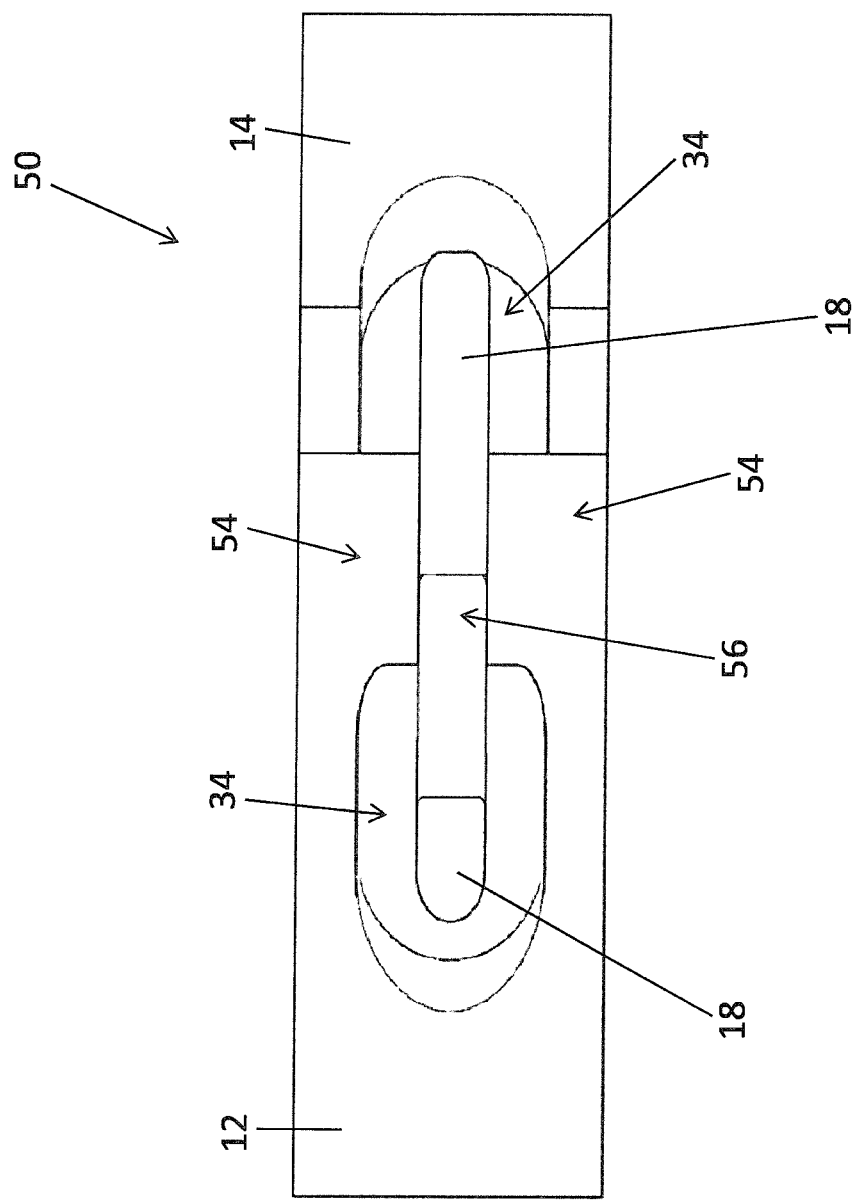
FIG. 7 shows a schematic front view of the eyeglass joint according to FIG. 5.
Figure 8:
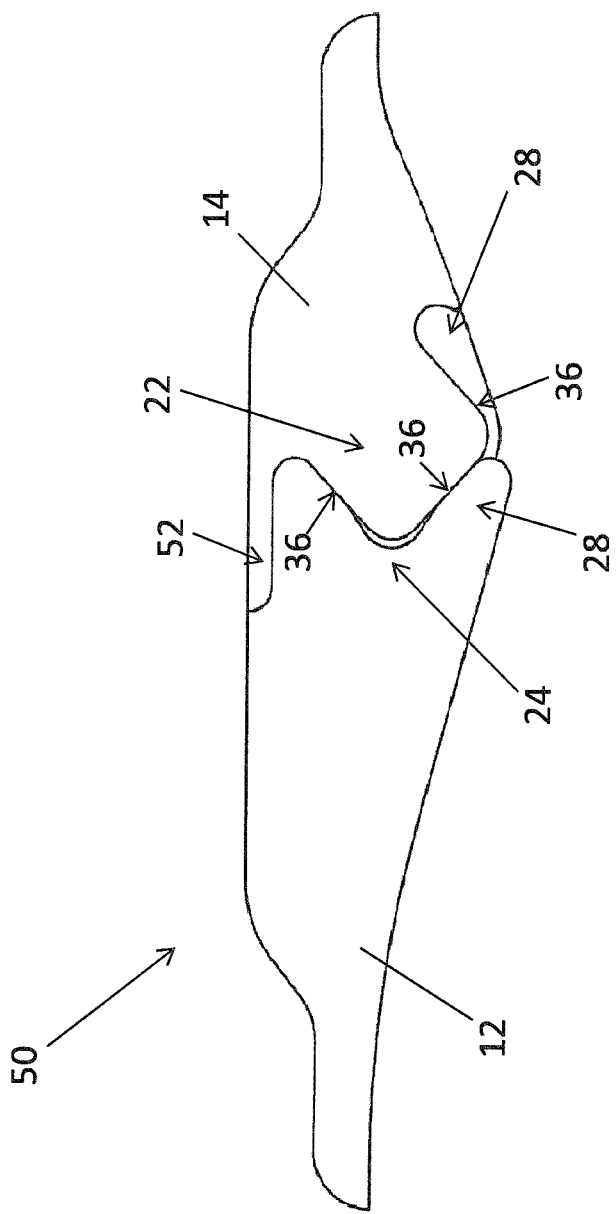
FIG. 8 shows a schematic top view of the eyeglass joint according to FIG. 5 in its use position.
Figure 9:
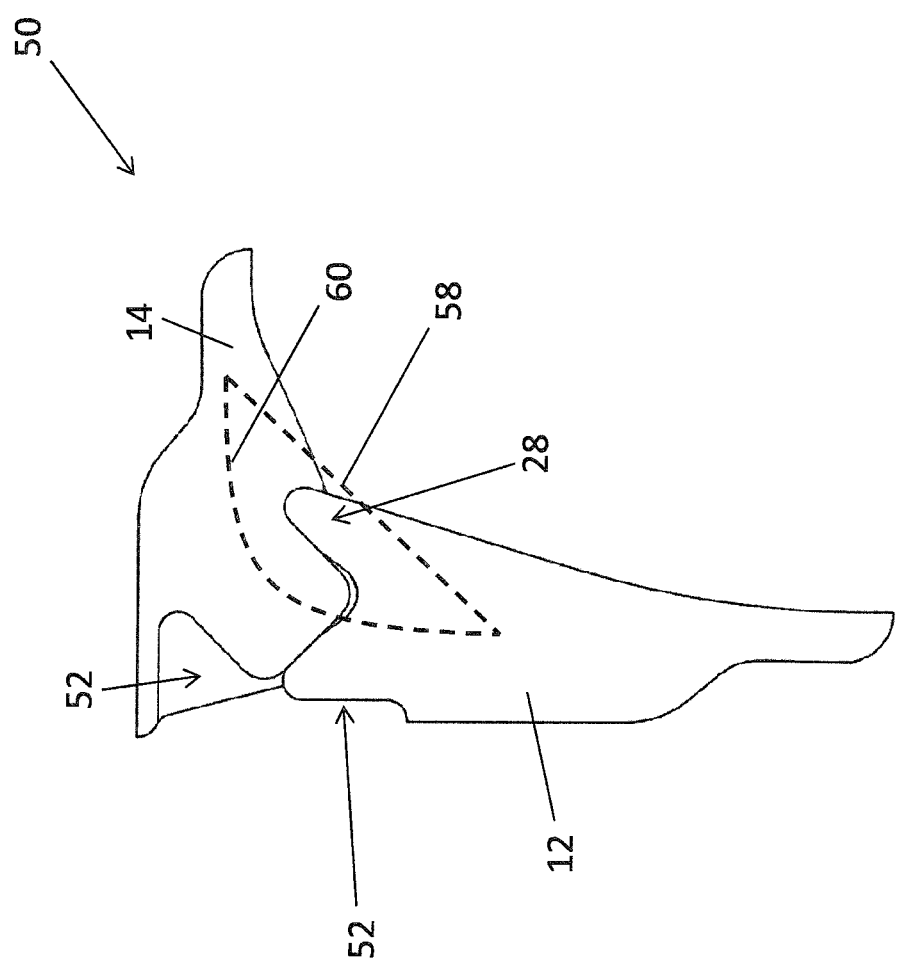
FIG. 9 shows a schematic top view of the eyeglass joint according to FIG. 5 in its stowage position.

Analogous to the figures of the eyeglass joint 10, the eyeglass joint 50 in FIG. 5 is shown in its use position, FIG. 6 shows a schematic perspective view of the eyeglass joint 50 in its stowage position, FIG. 8 shows a schematic top view of the eyeglass joint 50 in its use position, and FIG. 9 shows a schematic top view of the eyeglass joint 50 in its stowage position. The top view can correspond to a top view from above in the upward direction of the user wearing the glasses and standing in an upright posture. Due to the symmetrical design, the representation in the top view also corresponds to a bottom view.

As can be in seen in particular in FIG. 5 and FIG. 6, the eyeglass joint 50 not only comprises the stop 28, but also the additional stop 52. By means of the stop 52, the use position is specified particularly precisely and the eyeglass joint 50 is additionally stabilized in this position.

Furthermore, it can be seen that the two joint parts 12, 14 taper on a side facing away from the respective contact surfaces, in particular transversely to the main extension direction of the two joint parts 12, 14 or substantially orthogonally to a vertical plane when worn in an upright position. This tapering results in a particularly delicate appearance of the eyeglass frame. The tapering can be designed in particular with respect to a structural load of the respective joint parts 12, 14, which is particularly high in the portion of the respective contact surfaces and thus in the portion of the rolling portion 22 and the receiving portion 24 but which becomes smaller, in relative terms, on the respective sides facing away. Thus, the eyeglass joint 50 can have a particularly low weight.

In addition, compared to the first embodiment (eyeglass joint 10), the respective retaining elements 18 and grooves 34 are designed differently in the eyeglass joint 50.

The retaining elements 18 of the eyeglass joint 50 have no undercuts 20. Instead, the retaining elements 18 are slightly inclined in relation to a plane formed by the spring element 16 (which is difficult to see in FIGS. 5 to 9 and therefore is not provided with a reference number, but is arranged in the grooves 34) in the use position. Similarly to the undercuts 20, this inclination (70) of the retaining elements 18 first causes a retention of the spring element 16 in the respective grooves 34. However, if the eyeglass joint 50 is pressed together beyond the stowage position, i.e. if the two joint parts 12, 14 are folded closed onto each other beyond the position shown in FIG. 6 and FIG. 9 above, the spring element 16 can slip off the retaining elements 18 by itself. As a result, the two joint parts 12, 14 are separated from each other, whereby damage to the eyeglass joint 50 can be avoided if it is over-compressed. Subsequently, the spring element 16 can be simply pulled over the retaining elements 18 again to disassemble the eyeglass joint 50. This makes the eyeglass joint 50 particularly robust. In total, the assembly and disassembly of the spring element 16 is simplified due to the slanted retaining elements 18 compared to the eyeglass joint 10 comprising the retaining elements 18 with the undercut 20.

Furthermore, the groove 34 on the first joint part 12 is formed such that it comprises an undercut 54 on a side facing the second joint part 14. For assembly and disassembly, the spring element 16 therefore has to be threaded through a middle gap 56, which can also be called an opening 56. In the mounted state of the two joint parts 12, 14, this middle gap 56 is closed by the holding element 18 of the second joint part 14, at least in the normally intended joint positions. The normally intended joint positions are usually the stowage position, the use position, and all the positions in between in the movement plane. The retaining element 18 of the second joint part 14 at the eyeglass joint 50 thus glides through the middle opening 56, thus additionally connecting the joint parts 12, 14 in a compact design. Accordingly, the spring element 16 must first be arranged on the first joint part 12 for assembling the eyeglass joint 50 and only then on the retaining element 18 of the second joint part 14. This ensures that the spring element 16 is not released unintentionally or lost.

At the same time, the undercut 54 serves to provide a further preload of the spring element 16 of the eyeglass joint 50 in the stowage position as well. The undercut 54 thus ensures that the spring element 16 must substantially follow the contour of the two grooves 34 in the stowage position of the eyeglass joint 50. Otherwise, the spring element, for example, would be arranged at least partially outside the grooves 34 in the stowage position of the eyeglass joint 50. Such a course of the spring element 16 is, for example, illustrated by the dotted line 58 in FIG. 9. However, due to the undercut 54, the spring element 16 follows the course illustrated by the dotted line 60. Thus, a sufficient preload of the spring element 16 can also be ensured in the stowage position, in order to hold the two joint parts 12, 14 together without requiring a strong preload in the use position. This relieves the eyeglass joint 50. In addition, the spring element 16 is still arranged in the grooves 34 in the stowage position of the eyeglass joint 50 and thus protected against damage.

Thus, the spring element 16 of the eyeglass joint 50 is supported by the undercut 54 only in a certain joint position range, which is in particular adjacent to the stowage position. For further illustration of the grooves 34, the retaining elements 18 and the undercut 54 of the eyeglass joint 50, it is also shown in a perspective interior side view in FIG. 7.

Furthermore, it can for example be seen especially well in FIG. 8 that a certain gap is provided at the corner between the plane support surfaces 36 of the rolling portion 22 and the receiving portion 24 a certain gap is provided in the eyeglass joint 50. This gap allows a particularly uniform adjustment between the stowage position and the use position, i.e. the respective joint parts 12, 14 can be moved particularly evenly relative to each other. On the other hand, with an unrounded corner and/or a gap-free fit, the joint parts could easily get caught and/or jerk during the adjustment of the eyeglass joint 50.

Figure 10:
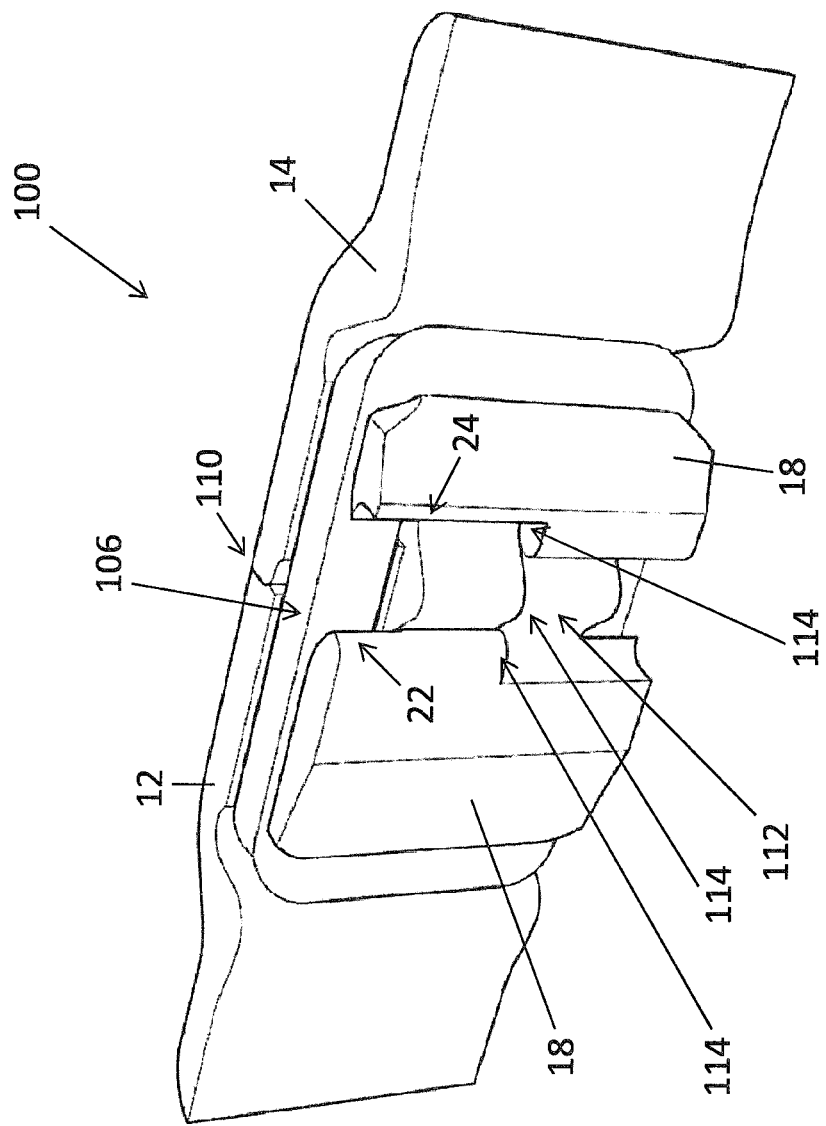
FIG. 10 shows a schematic perspective view of a further embodiment of a eyeglass joint in its use position.
Figure 11:
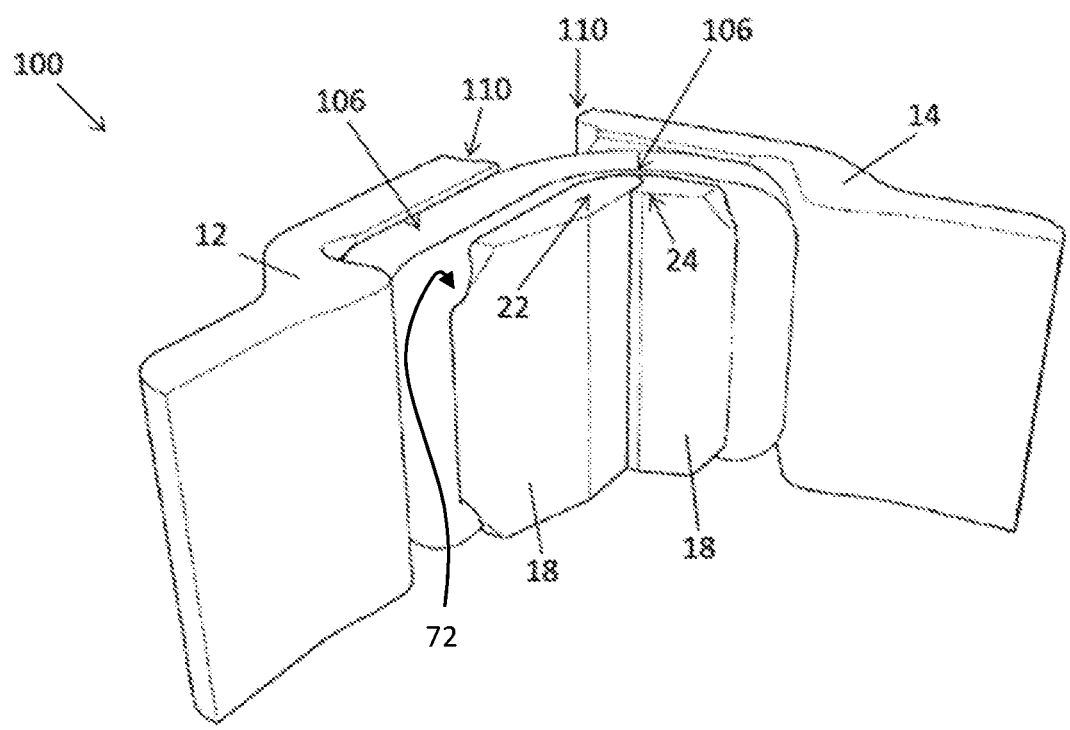
FIG. 11 shows a schematic perspective view of the eyeglass joint according to FIG. 10 in its stowage position.
Figure 12:
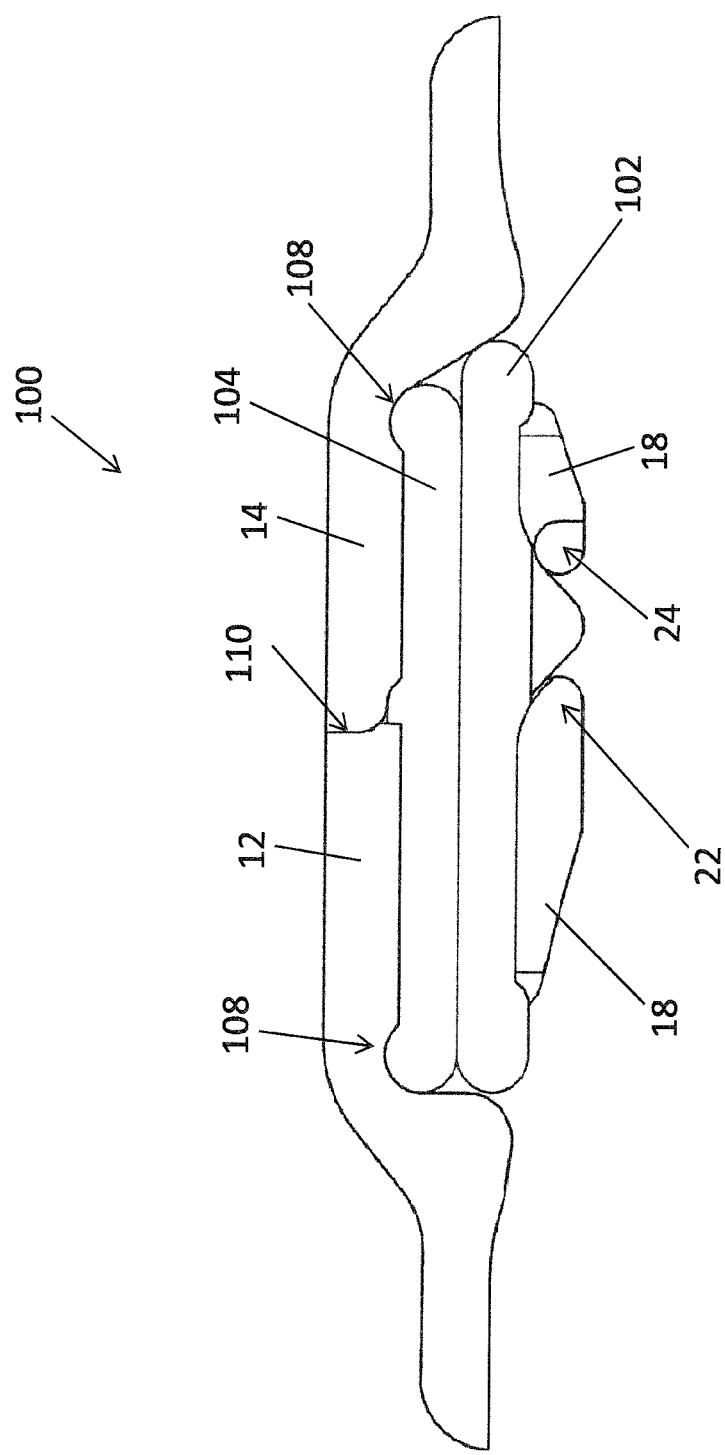
FIG. 12 shows a schematic top view of the eyeglass joint according to FIG. 10 in its use position.
Figure 13:
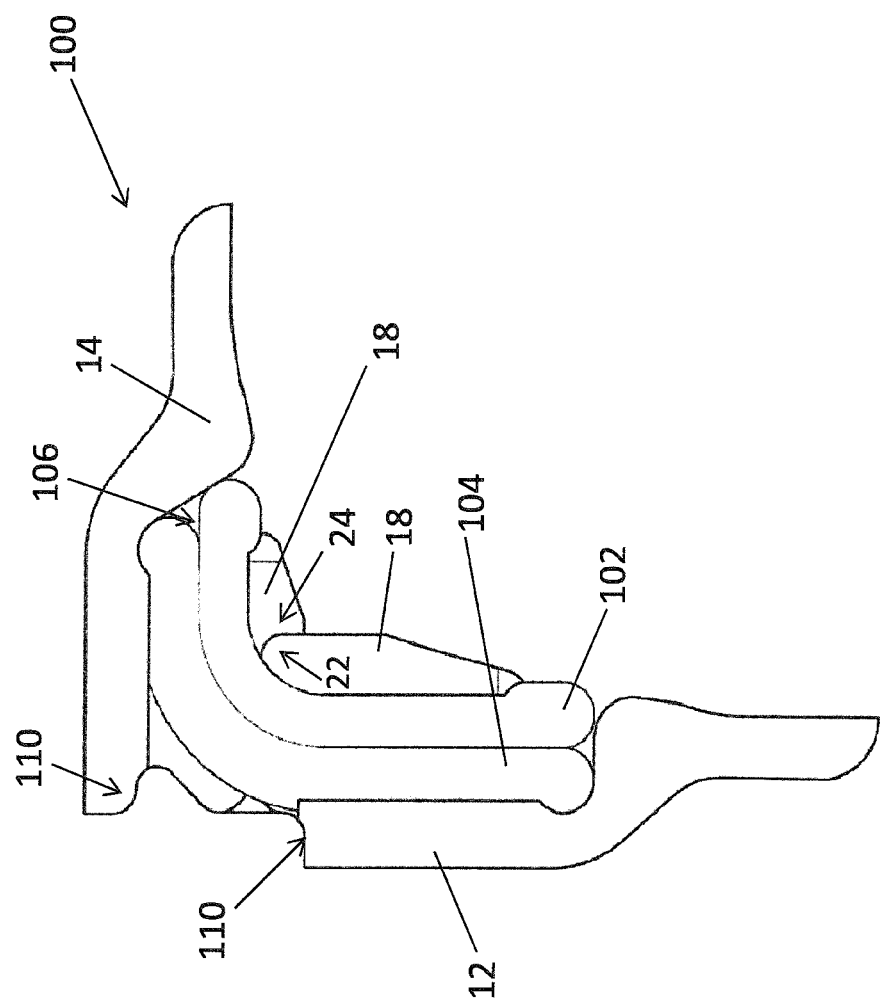
FIG. 13 shows a schematic top view of the eyeglass joint according to FIG. 10 in its stowage position.

The third embodiment of the eyeglass joint shown in the schematic perspective view according to FIG. 10, which has been assigned the reference number 100, differs from the first two embodiments in particular in that the two joint parts 12, 14 are now connected by means of a first spring element 102 and a second spring element 104. This can be seen particularly clearly in the schematic top view of the eyeglass joint 100 according to FIG. 12, which also shows the eyeglass joint 100 in its use position. The third embodiment of the eyeglass joint 100 is also shown in its stowage position in the schematic perspective view according to FIG. 11. Similarly, the schematic top view of FIG. 13 shows the eyeglass joint 100 in its stowage position.

The two joint parts 12, 14 each have a holding element 18, each of which comprises an undercut at which the inner spring element 102 is supported at a side facing in the head of the wearer when the eyeglass frame is worn. On a side facing away from that side, the corresponding second spring element 104 is supported, so that both spring elements 102, 104 are safely incorporated in a recess 106 surrounding the two retaining elements 18. The two joint parts 102, 104 additionally comprise a torus-shaped indentation 108 at the recess 106, by means of which the spring element 104 is additionally fixed in its position in the recess 106. This torus-shaped indentation 108 can be formed as a circumference according to the ring form of the spring element 104, or only at the sides of the recess 106 facing away from the rolling portion 22 and the receiving portion 24.

In addition, the receiving portion 24 and the rolling portion 22 are visibly different in the eyeglass joint 100. In the eyeglass joint 100, the rolling portion 22 and the receiving portion 24 do not form straight engaging surfaces, which in turn specify a use position and/or stowage position of the eyeglass joint 100. Instead, the use position of the eyeglass joint 100 is only determined by the stop 110, as can be seen in FIGS. 10 and 12. The stowage position of the eyeglass joint 100, shown in the schematic perspective view according to FIG. 11 and in the top view according to FIG. 13, is specified by the alternating recesses and elevations in a center portion on an inner side of the eyeglass joint 100, which are indicated here with the reference number 112. These alternating elevations and recesses in the portion 112 also form support surfaces 114 at the same time, which are arranged substantially parallel to the movement plane of the eyeglass joint 100 between the stowage position and the use position. These support surfaces 114 serve to additionally support the eyeglass joint against a tilting of one of the two joint parts 12, 14 upwards or downwards relative to the other of the two joint parts 12, 14 during an adjustment between those two positions. This provides an additional guide, which ensures a uniform alignment between the two positions and prevents unintentional tilting.

By means of the two provided spring elements 102, 104, the eyeglass joint 100 can be adapted particularly well with respect to respective adjusting forces and automatic reset forces. For example, the spring element 104 can substantially define an snap effect in the use position and the spring element 102 can substantially define the snap effect into the stowage position. Accordingly, respective forces for moving from these respective positions can be specified at least partially independently of each other. In addition, the angular ranges in which the eyeglass joint 100 snaps into one or the other position can also be changed or specified.

For such a change, the geometries of the rolling portion 22 and the receiving portion 24 of the eyeglass joint 100 do not necessarily have to be changed; one can merely replace the spring elements 102, 104. This is also possible because no corresponding support surfaces are predetermined, which already substantially predetermine at which angle range the eyeglass joint 100 snaps into one or the other position, as it is for example specified with the cubic shape of the rolling portion 22 and the receiving portion 24 in the eyeglass joint 10 and the eyeglass joint 50. In the eyeglass joint 100, on the other hand, the rolling portion 22 and the receiving portion 24 are substantially rounded.

Figure 14:
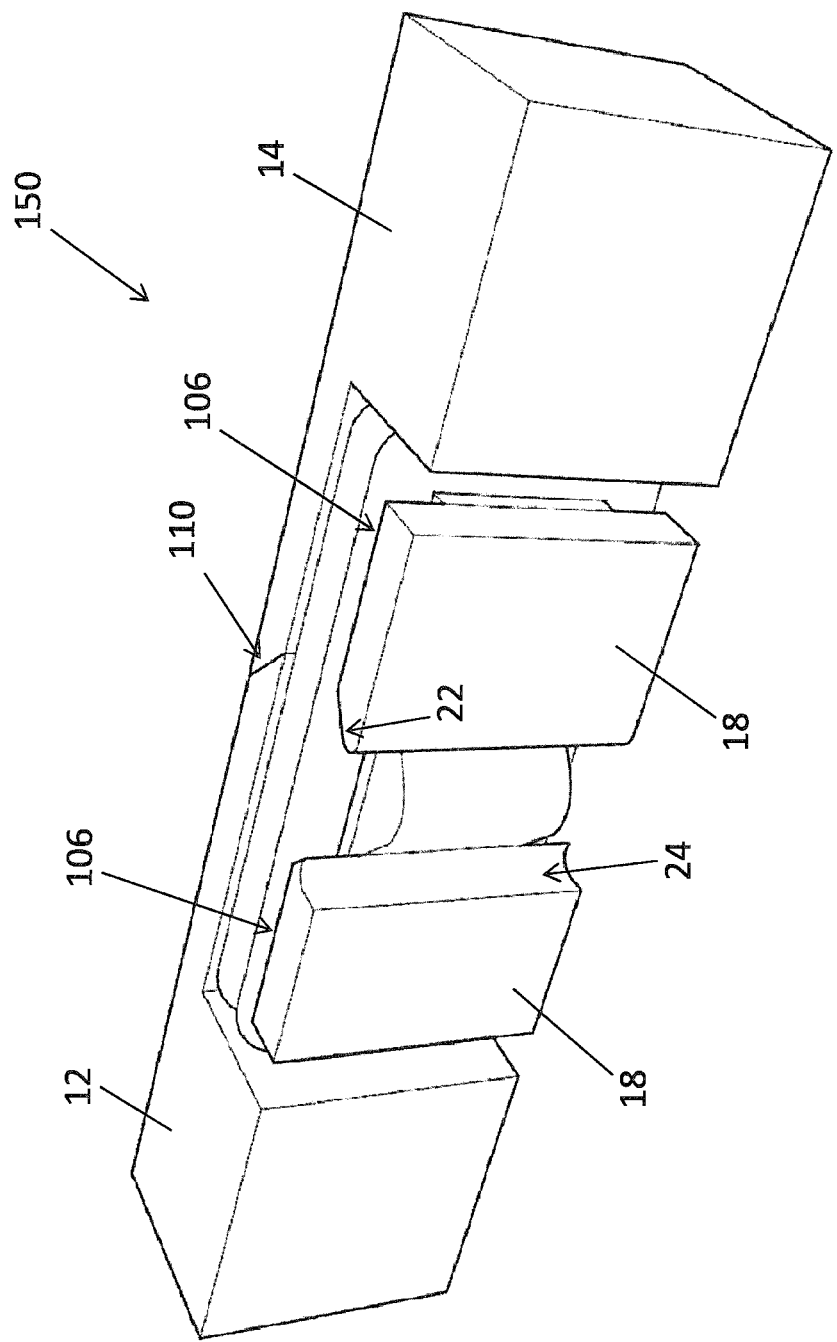
FIG. 14 shows a schematic perspective view of a further embodiment of an eyeglass joint in its use position.
Figure 15:
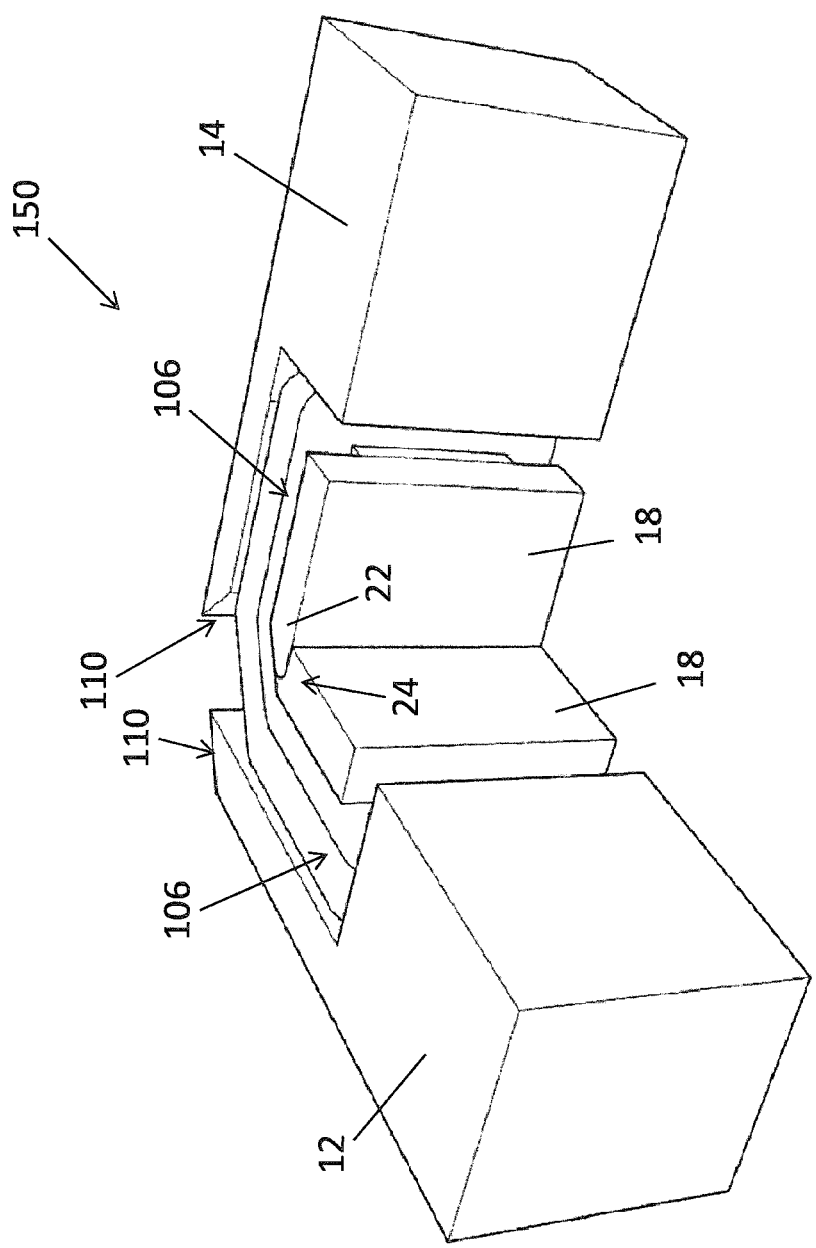
FIG. 15 shows a schematic perspective view of the eyeglass joint according to FIG. 14 in its stowage position.
Figure 16:
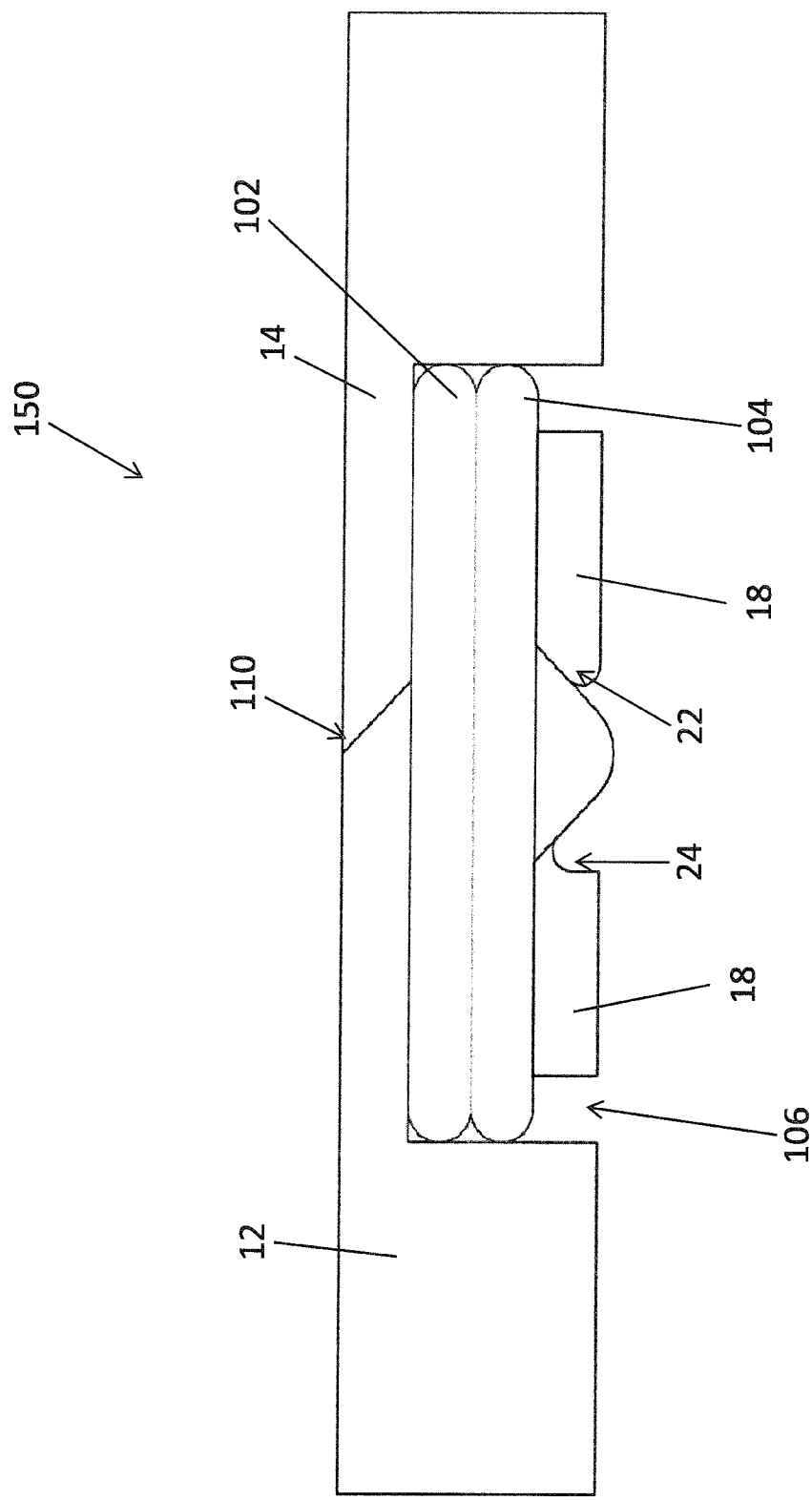
FIG. 16 shows a schematic top view of the eyeglass joint according to FIG. 14 in its use position.
Figure 17:
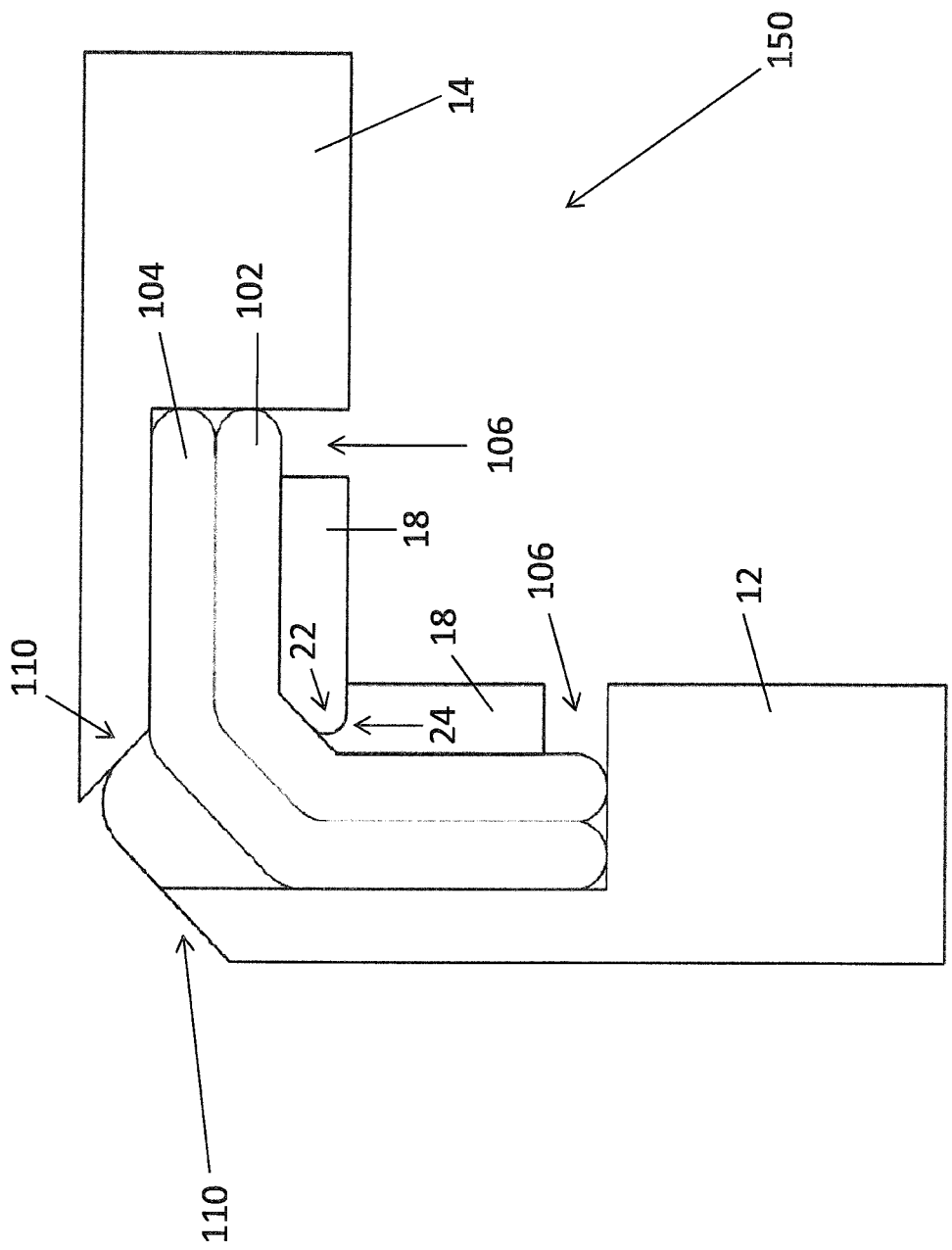
FIG. 17 shows a schematic top view of the eyeglass joint according to FIG. 14 in its stowage position.

The schematic perspective view of FIG. 14 shows a fourth embodiment of the eyeglass joint, which has been assigned the reference number 150. The eyeglass joint 150 is formed similar to the eyeglass joint 100, in particular, two spring elements 102, 104 are provided here as well. These two spring elements 102, 104 can be seen especially clearly in the schematic top views of the eyeglass joint 150 according to FIG. 16 and FIG. 17. The use position of the eyeglass joint 150 is shown in FIG. 14 and FIG. 16, while the stowage position of the eyeglass joint 150 is shown in the schematic perspective view according to FIG. 15 and FIG. 17.

The eyeglass joint 150 can also be understood as a simplified version of the eyeglass joint 100. Here, there is no tapering on the sides facing away from the contact surfaces between the two joint parts 12, 14. Similarly, there are no alternating elevations in the receiving portion 24 or in the rolling portion 22. In addition, a torus-shaped indentation is provided for holding the spring element 104 in the recess 106. Thus, the two joint parts 12, 14 of the eyeglass joint 150 can be manufactured particularly cost-effectively.

In order to make the respective eyeglass joints 10, 50, 100, 150 particularly wear-resistant, they can be provided with an additional sliding layer in the area of the respective contact surfaces, i.e. in particular in the rolling portion 22 and in the receiving portion 24. This sliding layer can be formed, for example, by an epoxy resin, whereby a friction wear of the two joint parts 12, 14 can be particularly minimized. Alternatively, or additionally, a lubricant can for example be provided between the two joint parts 12, 14, for example Teflon powder. Alternatively, or additionally, the two joint parts 12, 14 can also be provided with a permanent Teflon layer.

Due to the fact that the eyeglass joints 10, 50, 150 and 200 can be assembled and disassembled particularly easily, they can also be part of a joint set and/or eyeglass frame sets. Thus, several different joint parts 12, 14 and/or several different spring elements 16, 102, 104 can be provided. A home user can then configure and assemble a corresponding eyeglass joint according to his personal requirements. Similarly, for example, the rim and/or the eyeglass temple can be replaced according to different requirements. At the same time, the eyeglass joints 10, 50, 100, 150 also allow an easy replacement and/or repair of individual parts as well.

Due to the fact that the two joint parts 12, 14 are only held against each other by respective spring elements 16 or 102 and 104, there is no rigid axis of rotation for a corresponding eyeglass joint. Instead, the two joint parts 12, 14 can adjust relative to each other by both a rotary and a translational movement. In particular, an adjustment between the stowage position and the use position can be carried out by a combined sliding and rolling.

Respective manufacturing tolerances can be particularly large, especially in the area of the rolling portion 22 and the receiving portion 24. A compression of the two joint parts 12, 14 by means of the spring element 16 or 102 and 104, automatically results in a tolerance compensation and the two joint parts 12, 14 are held together with a minimal gap in every position. The eyeglass joint 10, 50, 100, 150 has an integral tolerance compensation, which makes it particularly cost-effective. Corresponding manufacturing tolerances can be significant. In particular, due to deviations during manufacturing, a quick getting caught and/or blocking of the eyeglass joint 10, 50, 100, 150 is not as likely as it is in the case of conventional joints. In addition, a corresponding joint does not detach even with repeated adjustment and/or must be readjusted by an optician, as is the case for example with a screwed eyeglass hinge. In particular, the eyeglass joints 10, 50, 100, 150 are not permanently deformed by overloads and/or overstretching and/or over-compressing, and do not necessarily require maintenance after such a load.

The eyeglass joints 10, 50, 100, 150 are symmetrically formed with respect to their upward direction, which is advantageous for manufacturing.

Figure 18:
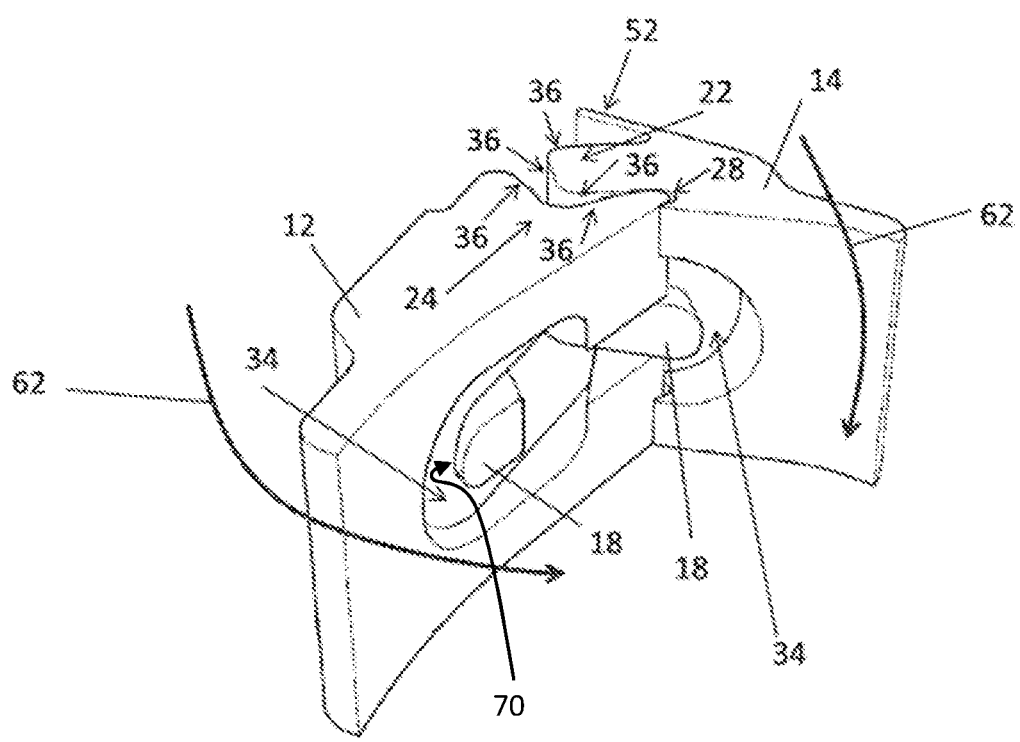
FIG. 18 shows a schematic perspective view of the eyeglass joint according to FIG. 5 in an over-compressed joint position.
Figure 19:
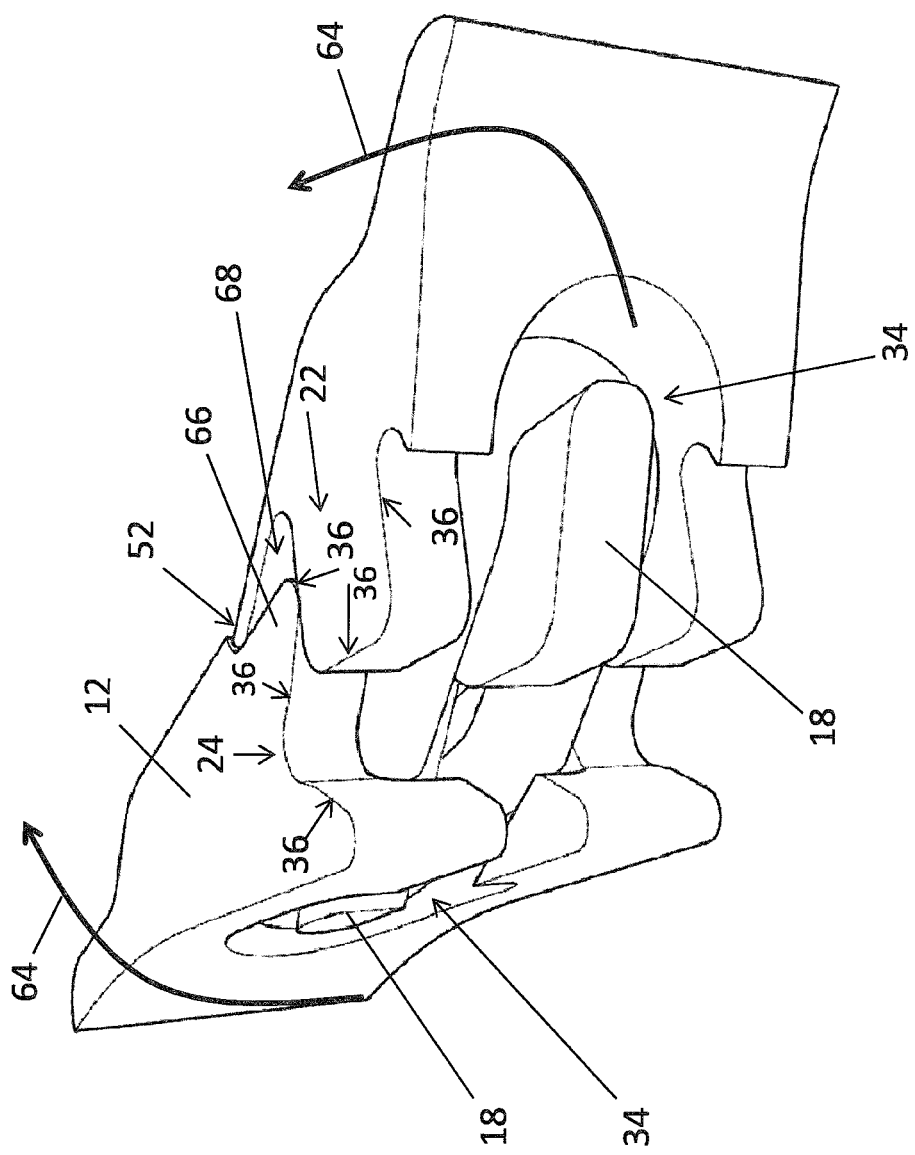
FIG. 19 shows a schematic perspective view of the eyeglass joint according to FIG. 5 in an overstretched joint position.
Figure 20:
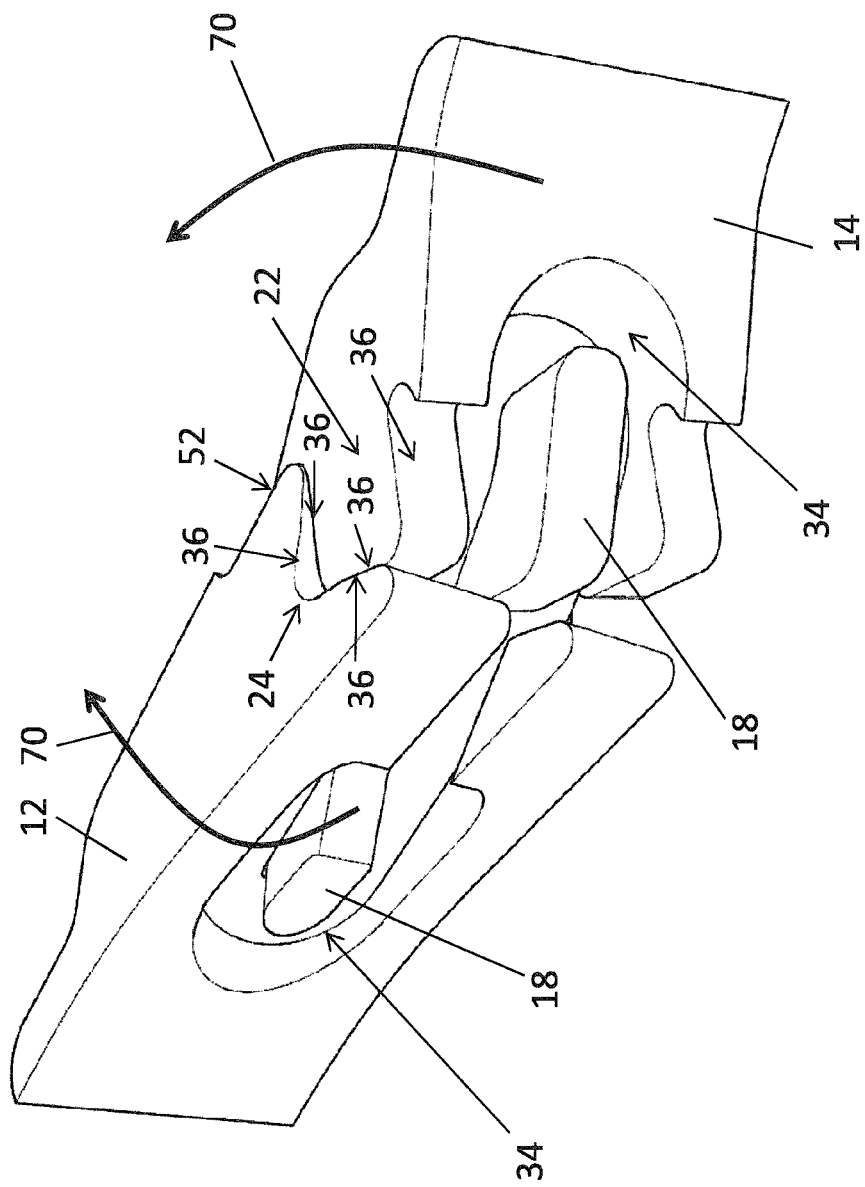
FIG. 20 shows a schematic perspective view of the eyeglass joint according to FIG. 5 in a joint position directed upwards from its plane of movement.

FIG. 18, FIG. 19 and FIG. 20 each show a schematic perspective view of eyeglass joint 50 according to FIG. 5. Here, various positions are shown, which the eyeglass joint 50 should not normally take during an adjustment between its stowage position and its use position, and which in conventional eyeglass joints quickly lead to damage and/or permanent deformation. However, the eyeglass joint 50 can accommodate such joint positions and the loads associated with them without being damaged. Such joint positions can also be taken by the eyeglass joints 10, 100 and 150 without damage.

FIG. 18 shows the eyeglass joint 50 in an over-compressed position. The two joint parts 12, 14 have been moved beyond the stowage position towards each other in the direction of the arrows 62, wherein this movement was still carried out in the movement plane between the stowage position and the use position. Such over-compressing can take place, for example, by pressing on a pair of glasses hooked on to a shirt. As can be seen, in this case the two joint parts 12, 14 roll on each other at the stop 28, while the respective straight surfaces 36 move away from each other. The spring element 16 will continue to be in contact with the undercuts 54 and is thus stretched further compared to the stowage position. This creates an additional resetting force, which automatically adjusts the eyeglass joint 50 back into the stowage position after termination of the compressing of the glasses.

Since no axle pin is present and the spring element 16 is designed to accommodate such an additional stretch without damage, the eyeglass joint 50 is not damaged and/or permanently deformed. Instead, the eyeglass joint 50 automatically readjusts itself based on the straight surfaces 36 due to the joint parts 12, 14 being tensioned against each other by the spring element 16. Since the two joint parts 12, 14 roll at the stop 28 and no portion of the joint parts 12, 14 is subjected to inadmissible loading, such an improper load can easily be absorbed by the eyeglass joint 50.

FIG. 19 shows the eyeglass joint 50 in an overstretched position. The two joint parts 12, 14 have been moved away from each other in the direction of the arrows 64 beyond the use position, wherein this movement was still carried out in the movement plane between the stowage position and the use position. Such an overstretching can occur, for example, if the wearer lays his head sideways on a pillow while wearing the glasses. As can be seen, in this case the two joint parts 12, 14 roll on each other at the additional stop 52, while the respective straight surfaces 36 withdraw from each other. In particular, a wedge-shaped portion 66 of the joint part 12 slides on a corresponding recess 68 of the joint part 14 formed at the stop 52. The spring element 16 will continue to be in contact with the bottom of the grooves 34 and is thus stretched further compared to the stowage position. This creates an additional resetting force, which automatically adjusts the eyeglass joint 50 back into the use position after termination of the forces causing the overstretching. Accordingly, the eyeglass joint 50 is also protected against damage by overstretching and is easy to handle since no maintenance is required after such an improper load.

If the eyeglass joint 50 is overstretched to such an extent that the wedge-shaped portion 66 completely slides out of the corresponding recess 68, there is also an additional relief of the eyeglass joint 50. In this case, the joint part 12 can jump off the joint part 14, so to speak. Thus, the spring element is stretched less from this point forward, so that both the load on the joint parts 12, 14, in particular the thin-walled portion of the joint part 14 of the stop 50 facing away from the groove 34, as well as that on the spring element 16 itself decreases. Such a state can also be understood as a partially dissolved joint connection, since upon further over-stretching, the two joint parts 12, 14 are substantially no longer in contact at the rolling portion 22 and the receiving portion 24, and substantially no longer roll and/or slide on each other at a further overstretch, either.

Thus, it is possible to open the eyeglass joint 50 so far until the respective outer sides of the two joint parts 12, 14 facing away from the groove 34 are at least partially in contact with each other, without damage. Depending on the preload of the spring element 16 and geometries of the joint parts 12, 14 it may then be necessary to manually reconnect the partially detached joint connection. This can be done by turning back one of the two joint parts 12, 14 in the direction of the use position, wherein the wedge-shaped portion 66 is threaded into the corresponding recess 68. Even after that, the eyeglass joint 50 automatically readjusts itself. Accordingly, this partial manual connection can also be done intuitively by an eyeglass owner without the help of an optician, tool and/or additional training.

FIG. 20 shows the eyeglass joint 50 in a use position rotated upwards out of the movement plane. Here, the two joint parts 12, 14 have been moved upwards in the direction of the arrows 70 from the movement plane, which can be defined by a direct connection between the stowage position and the use position or a pivoting movement between these positions. Such a bending can for example occur as a consequence of an accidental load on a pair of glasses placed on a table in the use position.

As can be seen, in this case, the two joint parts 12, 14 roll on each other at the top edge, while the respective straight surfaces 36 again withdraw from each other. The spring element 16 will continue to be in contact with the bottom of the grooves 34 and is thus stretched further compared to the use position. This creates an additional resetting force, which automatically adjusts the eyeglass joint 50 back into the use position after termination of the forces causing the bending. Accordingly, the eyeglass joint 50 is also protected against damage by bending out of the movement plane and is easy to handle since no maintenance is required after such an improper load.

Such bending can also be done in combination with a previously described overstretching and over-compressing, without damaging the eyeglass joint 50. Similarly, alternatively or in addition, a pulling apart of the two joint parts 12, 14 and/or a rotation of respective joint parts 12, 14 around their longitudinal axis, which can be predetermined by a main extension direction and/or extend in the movement plane, can be carried out without damaging the eyeglass joint 50. In all the cases, the spring element 16 can be further stretched, so that a reset force causes an automatic return to an initial position in the movement plane and in a correct alignment of the two joint parts 12, 14 to each other, in particular in the stowage position or the use position.

Of course, analogously to the eyeglass joint 50, the other embodiments (glasses joint 10, 100, 150) with their respective joint parts 12, 14 can also be overstretched, overcompressed, bent, pulled apart and/or rotated without damaging them. In particular, the joint parts 12, 14 can automatically return to their initial position.

Figure 21:
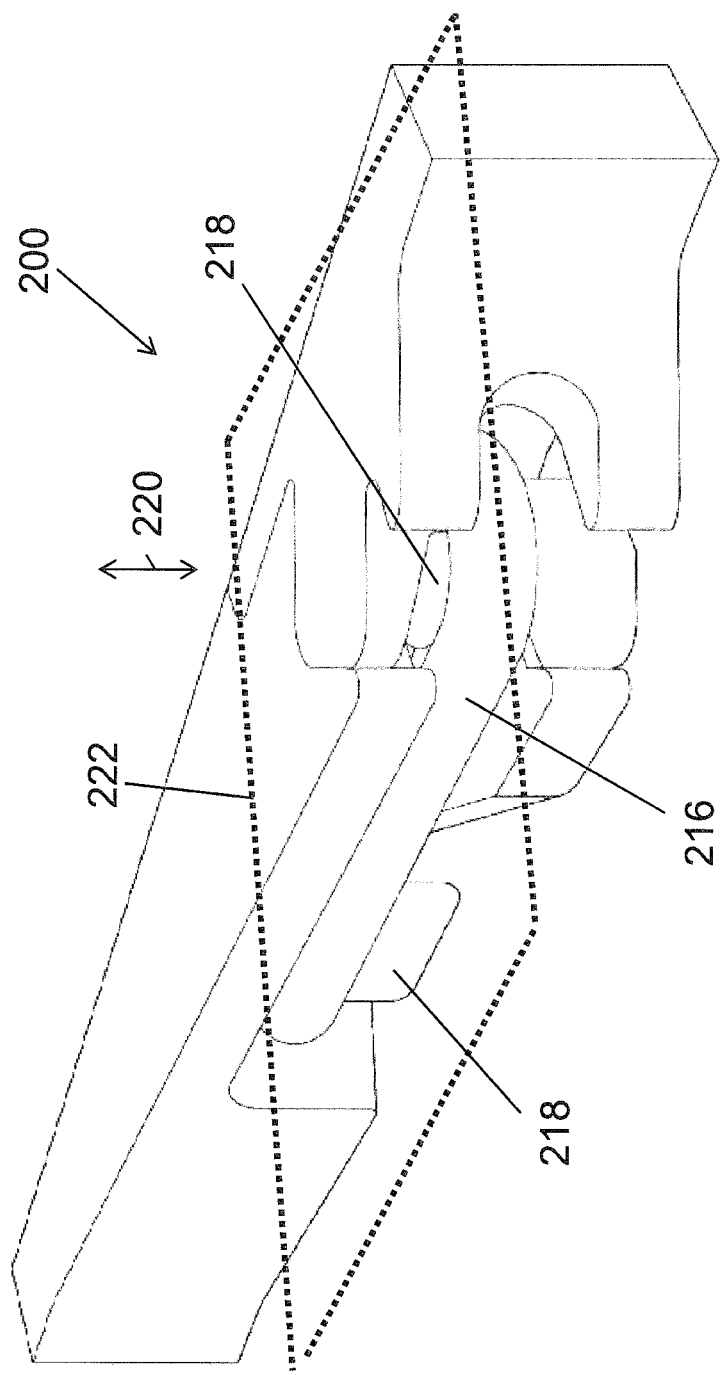
FIG. 21 shows a schematic perspective view of a further embodiment of an eyeglass joint in its use position.

FIG. 21 shows a schematic perspective view of a further embodiment of an eyeglass joint 200. The eyeglass joint 200 has a functionality and construction which is basically similar to the eyeglass joints 10, 50 and 100. Respective features of these embodiments, such as providing several spring elements, can also be provided in the embodiment of the eyeglass joint 200. In contrast to the previously shown eyeglass joints 10, 50 and 100, the respective cone-shaped and/or hook-shaped retaining elements 218 of the eyeglass joint 200 do not substantially extend in the movement plane and a plane defined by the ring shape of the respective spring element 16, 102, 104 does not extend orthogonally to the movement plane, either. Instead, the respective cone-shaped and/or hook-shaped holding elements 218 extend slanted, in the present case substantially orthogonally, to the movement plane of the eyeglass joint 218 and a plane defined by the ring shape of the spring element 216 of the eyeglass joint 200 extends substantially parallel to the movement plane, in the present case in the movement plane.

Figure 22:
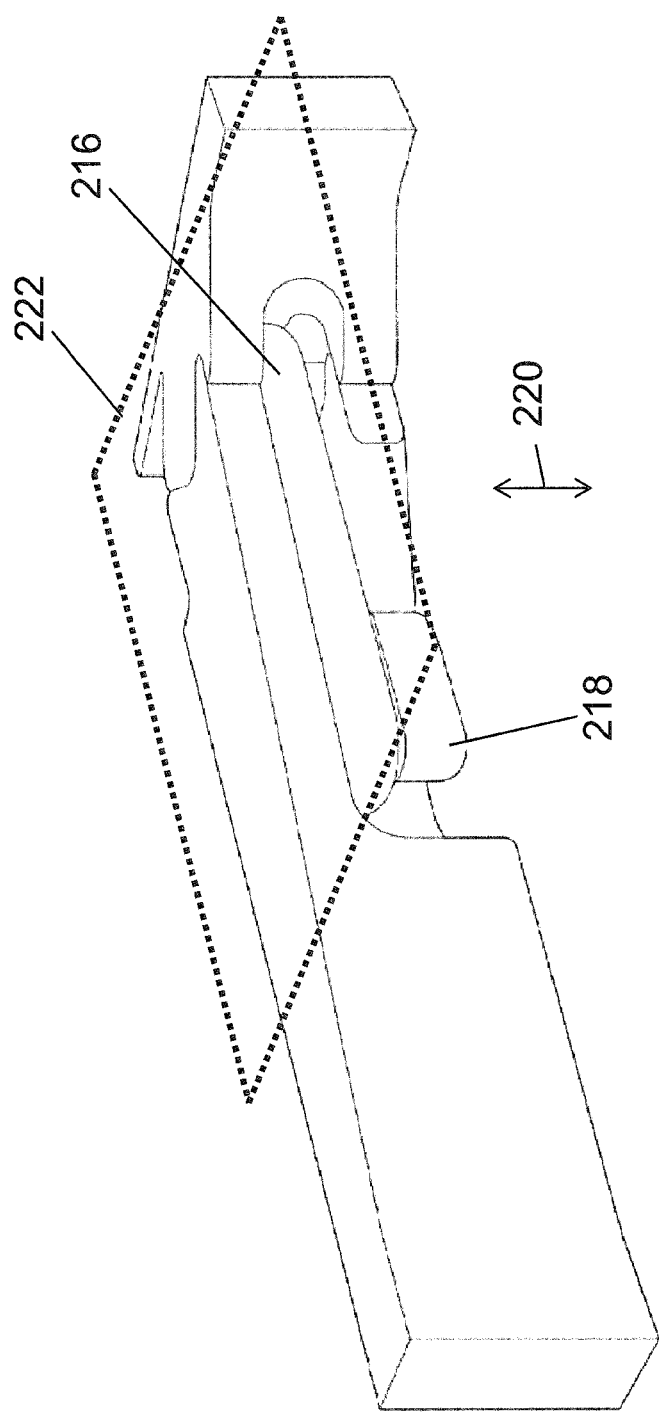
FIG. 22 shows a schematic perspective view of the eyeglass joint according to FIG. 21 in its stowage position.

Due to this alignment of the retaining elements 218, the eyeglass joint 200 can be particularly flat in an upward direction, which is illustrated by the double arrow 220 in FIG. 21 and FIG. 22 and which corresponds to an upward direction when glasses with the eyeglass joint 200 are worn. The assembly space the spring element requires in the upward direction, no longer corresponds to a double radius of the loop formed by the spring element around the retaining element 218, but substantially only the diameter of the annular spring element 216 itself. Accordingly, the eyeglass joint 200 can be formed flatter in this direction.

As can also be seen particularly well in FIG. 21, the retaining elements 218 are open in opposite directions for threading the spring element 216. For example, the spring element 216 can only be threaded from the bottom onto the holding element 218 shown on the left in FIG. 21, and it can only be threaded from the top onto the holding element 218 shown on the right. In the respective other direction, on the other hand, the respective joint part, which is formed integrally with the respective holding element 218, forms a stop. This reliably prevents accidental slipping or stripping of the spring element 218 in the flat design of the eyeglass joint 200, for example when the glasses are put on or taken off. As a result, the eyeglass joint 200 cannot unintentionally be disassembled.

The movement plane of the eyeglass joint 200 can easily be seen by comparing FIG. 21 with FIG. 22 where it is represented by the dotted line 222. FIG. 21 shows the eyeglass joint 200 in the use position, while FIG. 22 shows the eyeglass joint 200 in its stowage position in a schematic perspective view, wherein a movement between these two positions defines the movement plane. Here, the movement plane extends orthogonally to the upward direction illustrated by the arrow 220. In particular, the movement plane lies in a plane formed by the ring shape of the spring element 216 and vice versa.

Figure 23:
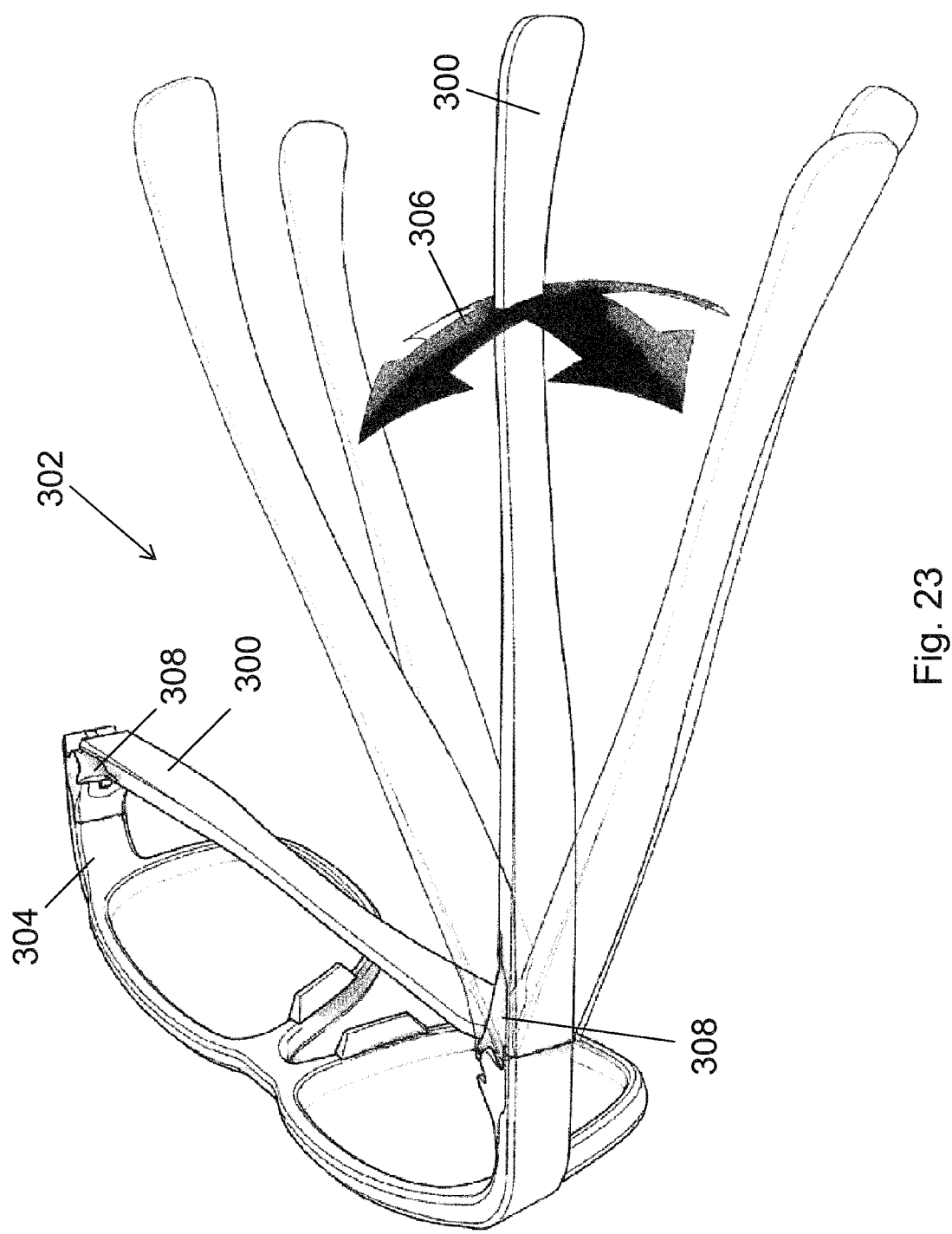
FIG. 23 illustrates the possible movement of an eyeglass temple relative to a rim in an eyeglass frame comprising one of the previously shown eyeglass joints in a schematic perspective view.

FIG. 23 illustrates, for all eyeglass joints 10, 50, 100 and 200 shown in the other figures, in a schematic perspective view how an eyeglass temple 300 of an eyeglass frame 302 can be moved relative to the rim 304 of the eyeglass frame 302 without damaging the respective eyeglass joint. One of the two eyeglass temples 300 is shown in the stowage position. The other eyeglass temple 300 is shown in the use position, and with it an arrow 306, which shows a possible deflection from this position. Furthermore, exemplary positions of this eyeglass temple 300 are shown, in which the eyeglass joint is not damaged, and the eyeglass temple 306 furthermore automatically returns to the use position.

FIG. 23 furthermore illustrates a sliding layer or sliding piece 308, which forms a receiving portion of the eyeglass joint shown therein. For this purpose, the sliding layer or sliding piece 308 has a different thickness in different portions and forms a three-dimensionally shaped surface, which is independent of the shape of a surface on which the sliding layer 308 is applied. In the present case, the sliding layer 308 is formed, for example, as a plastic part. The sliding layer 308 can also be regarded as an intermediate part between the two joint parts. The sliding layer 308 is glued to the rest of the eyeglass temple 300, is particularly abrasion-resistant and slides particularly well on the corresponding rolling portion of the rim 304. As a result, the glasses shown can be adjusted particularly easily between the stowage position and the use position. In the case of wear of the sliding layer 308, it can also be replaced without necessitating a replacement of the entire eyeglass temple 300.

The sliding layer 308 can for example also not be massively formed, as in the present case, but as a thin sleeve-shaped element, which can easily be attached to a receiving portion or rolling portion. In this case, the sliding layer 308 can also be referred to as a sliding sleeve. The sliding layer 308 may also be formed as a thin layer with an substantially consistent thickness, whose shape then corresponds to the shape of the underlying joint part, in particular a receiving portion or rolling portion formed thereon.

LIST OF REFERENCE NUMBERS 10 eyeglass joint
12 first joint part
14 second joint part
16 spring element
18 retaining element
20 undercut
22 rolling portion
24 receiving portion
26 arrow
28 stop
30 arrow
32 portion
34 groove
36 straight surface
50 eyeglass joint
52 stop
54 undercut
56 middle gap
58 dotted line
60 dotted line
62 arrow
64 arrow
66 wedge-shaped portion
68 recess
70 arrow
100 eyeglass joint
102 spring element
104 spring element
106 recess
108 indentation
110 stop
112 portion
114 support surfaces
200 eyeglass joint
216 spring element
218 retaining element
220 double arrow
222 dotted lines
300 eyeglass temple
302 eyeglass frame
304 rim
306 arrow
308 sliding layer

The invention claimed is:

1. Eyeglass joint for an eyeglass frame, having:
a first joint part, having two receiving areas separated by a recess, and a retaining element projecting from a surface of the first joint part between the two receiving areas,
a second joint part, having two rolling areas separated by a recess, and a retaining element projecting from a surface of the second joint part between the two rolling areas, and
a spring element made of rubber having a closed circumference and attached to both joint parts, wherein the first joint part and the second joint part are movably connected to each other by the spring element,
wherein in the attached condition, the receiving areas of the first joint part engage the rolling areas of the second joint part, both retaining elements project into the recess of the opposite joint part, and the spring element is retained around both retaining elements within both recesses.

2. Eyeglass joint according to claim 1, wherein
the two joint parts are tensioned against each other by the spring element such that they are movably connected.

3. Eyeglass joint according to claim 1, wherein
the receiving areas or the rolling areas comprise at least two support surfaces, in particular substantially flat support surfaces, which comprise an angle of between 75° and 105° to one another.

4. Eyeglass joint according to claim 1, wherein
one of the joint parts can move relatively to the other one of the joint parts substantially in a movement plane such that the eyeglass joint can be adjusted between a stowage position and a use position of the eyeglass frame.

5. Joint set for the configurable forming of an eyeglass joint according to claim 1, wherein
the joint set comprises several different spring elements which can be selected to configure the eyeglass joint to be formed, wherein the different spring elements differ in particular in their tension at the same elongation or in their length in an non-elongated state
or
the joint set comprises several different first joint parts or several different second joint parts which can be selected to configure the eyeglass joint to be formed, wherein the different first or the different second joint parts differ in particular in the geometry of the receiving areas or the rolling areas.

6. Eyeglass frame comprising a rim for at least one lens, two eyeglass temples and two eyeglass joints according to claim 1, wherein each eyeglass temple is movably connected with the rim by means of one of the two eyeglass joints.

7. Eyeglass joint according to claim 1, wherein the retaining elements include an undercut to retain the spring element.

8. Eyeglass joint according to claim 1, wherein the retaining elements are hook shaped to retain the spring element.

9. Eyeglass joint according to claim 1, wherein the retaining elements are inclined in relation to a plane formed by the spring element to retain the spring element.

* * * * *